United States Patent [19]
Capps et al.

[11] Patent Number: 5,778,404
[45] Date of Patent: Jul. 7, 1998

[54] STRING INSERTER FOR PEN-BASED COMPUTER SYSTEMS AND METHOD FOR PROVIDING SAME

[75] Inventors: Stephen P. Capps; Ernest H. Beernink, both of San Carlos; David T. Temkin, San Francisco, all of Calif.

[73] Assignee: Apple Computer, Inc., Cupertino, Calif.

[21] Appl. No.: 512,269

[22] Filed: Aug. 7, 1995

[51] Int. Cl.⁶ .................................................. G06F 19/00
[52] U.S. Cl. .................... 707/531; 345/179; 382/309; 707/534; 707/541; 395/347; 395/354; 395/358
[58] Field of Search ................... 395/801, 803, 395/804, 358, 397, 354, 796, 352–4; 345/179; 382/309–311

[56] References Cited

U.S. PATENT DOCUMENTS

| | | | |
|---|---|---|---|
| Re. 34,476 | 12/1993 | Norwood | 382/12 |
| 4,763,356 | 8/1988 | Day, Jr. et al. | 379/368 |
| 4,980,840 | 12/1990 | Yin et al. | 364/518 |
| 5,031,119 | 7/1991 | Dulaney et al. | 395/349 |
| 5,218,538 | 6/1993 | Zhang | 364/419 |
| 5,220,649 | 6/1993 | Forcier | 395/804 |
| 5,231,698 | 7/1993 | Forcier | 395/804 |
| 5,276,794 | 1/1994 | Lamb, Jr. | 395/149 |
| 5,594,640 | 1/1997 | Capps et al. | 395/794 |
| 5,603,053 | 2/1997 | Gough et al. | 395/825 |
| 5,613,019 | 3/1997 | Altman et al. | 382/311 |
| 5,621,641 | 4/1997 | Freeman | 395/796 |
| 5,638,501 | 6/1997 | Gough et al. | 395/135 |
| 5,649,223 | 7/1997 | Freeman | 395/796 |

OTHER PUBLICATIONS

"Graffiti: User's Guide for the Apple Newton MessagePad, Sharp Expert Pad PI–7000, Compatible Newton Devices," Palm Computing, Inc., Jan. 1994.

O'Donnell, "Graffiti 1.0—Newton Reviews," MacWEEK, Jan. 2, 1995, vol. 9, No. 1, p. 31.

*Primary Examiner*—Joseph H. Feild
*Assistant Examiner*—Jennifer C. Chen
*Attorney, Agent, or Firm*—Beyer & Weaver, LLP

[57] ABSTRACT

A string inserter for a computer system having a graphical user interface and a pointer capable of interacting with a graphical user interface includes an insertion marker, an insertion initiater, and an insertion implementer. The insertion marker is displayed on a screen of the computer system at an insertion point in displayed text corresponding to a string of text information. The insertion initiater is operative to detect a selection of the insertion marker with a the pointer mechanism of the computer system and to provide an insertion menu on the screen that includes a number of insertion labels. The insertion implementer is responsive to a selection of an insertion label with the pointer and is operative to insert an insertion string corresponding to the selection into the string of text information. A method for inserting an insertion string into a string of text information on a computer system includes the steps of displaying an insertion marker on a screen of the computer system, detecting a selection of the insertion marker with a pointer mechanism of the computer system and providing an insertion menu including a number of insertion labels in response thereto, and detecting a selection of an insertion label and inserting an insertion string corresponding to this selection into the string of text information.

32 Claims, 16 Drawing Sheets

As<SPACE>Hamlet<SPACE>said:<CR>Ah<SPACE>royal...

STRING INSERTER FOR PEN-BASED COMPUTER SYSTEMS AND METHOD FOR PROVIDING SAME

BACKGROUND OF THE INVENTION

The present invention relates generally to computer systems, and more particularly to text entry and editing for pen-based computer systems.

Computers are becoming increasingly powerful, lightweight, and portable. The computing power of computers that once filled entire rooms is now residing on a desktop. Laptop, notebook, and sub-notebook computers are virtually as powerful as their desktop counterparts. Even smaller hand-held computers are now capable of computing tasks that required much larger machines a few short years ago.

As a part of this trend, computerized personal organizers are becoming increasingly popular with a large segment of the population. Computerized personal organizers tend to be small, lightweight, and relatively inexpensive, and can perform such functions as keeping a calendar, an address book, a to-do list, etc. While many of these functions can also be provided in conventional computer systems, personal organizers are very well suited to the personal organization task due to their small size and portability. Personal organizers are available from many companies including Sharp and Casio of Japan.

A relatively new form of computer, the pen-based computer system, holds forth the promise of a marriage of the power of a general purpose computer with the functionality and small size of a personal organizer. An example of a pen-based computer system is the Newton® 120 pen-based computer made and marketed by Apple Computer, Inc. of Cupertino, Calif.

A pen-based computer system is typically a small, hand-held computer where the primary method for inputting data includes a "pen" or stylus. A pen-based computer system is commonly housed in a generally rectangular enclosure, and is provided with a dual-function display assembly that can serve as both an input device and an output device. When operating as an input device or "tablet", the display assembly senses the position of the tip of a stylus on the viewing screen and provides this positional information to the computer's central processing unit (CPU). Some display assemblies can also sense the pressure of the stylus on the screen to provide further information to the CPU. When operating as an output device, the display assembly presents computer-generated images on the screen.

The dual-function display assemblies of pen-based computer systems permit users to operate the computer as a computerized notepad, among other functions. For example, graphical images can be input into the pen-based computer by merely moving the stylus on the surface of the screen. As the CPU senses the position and movement of the stylus, it generates a corresponding image on the screen to create the illusion that the stylus is drawing the image directly upon the screen, i.e. that the stylus is "inking" an image on the screen. By "ink" it is meant that pixels on the screen are activated in such a manner that it appears that the stylus is leaving a trail of ink on the display assembly. With suitable recognition software, the "ink" can be recognized to input text, numerics, graphics, and other recognized information into the pen-based system.

While great strides have been made in handwriting recognition for pen-based computer systems, computers tend to have difficulty recognizing certain types of characters. For example, punctuation such as commas, apostrophes, quote marks, colons, etc. are typically difficult for a handwriting recognizer to handle. As a consequence, it is often necessary to edit the output of handwriting recognizers, particularly if hard-to-recognize characters such as punctuation are used.

In the past, it has been less-than-convenient to correct misrecognized characters. One prior art method includes providing an interactive image of a keyboard ("pseudo keyboard") which allows characters to be "typed" by tapping the stylus on an appropriate "key." This method has several disadvantages. First, procedure for accessing the pseudo keyboard may be cumbersome. Second, the corrections must be manually using an inefficient "hunt and peck" process. Third, the use of pseudo keyboards typically require that every inserted character (visible or not) be typed in by the user, which is a time-consuming and error-prone process.

SUMMARY OF THE INVENTION

The present invention provides a convenient and efficient string inserter for computer systems having graphical user interfaces (GUI) and, more particularly, for pen-based computer systems. A menu of difficult-to-recognize characters, such as punctuation, is provided with a simple tap on an insertion marker. In addition, context-dependent punctuation and abbreviations are handled in an automated fashion. In consequence, the present invention provides a string inserter optimized for use with pen-based computer systems having handwriting recognition.

More particularly, a string inserter for a computer system having a graphical user interface (GUI) and a pointer capable of interacting with the graphical user interface includes an insertion marker, an insertion initiater, and an insertion implementer. The insertion marker is displayed on the screen of the computer system at an insertion point in a displayed text corresponding to a string of text information. The insertion initiater is operative to detect an insertion selection of the insertion marker with the pointer (stylus). In response to the detection, the insertion initiater provides an insertion menu including a number of insertion labels. The insertion implementer, responsive to a selection of an insertion label with the pointer, then inserts the insertion string corresponding to the selected insertion label into the string of text information and, therefore, into the displayed text.

Preferably, the insertion marker is associated with a bounding box, and the insertion initiater detects the insertion selection when the pointer is sufficiently proximate to the bounding box to cause a selection. Preferably, the box is of a height and a width which facilitates the convenient selection of the marker with the pointer. The string inserter is preferably operative to change the appearance of the insertion marker as the pointer engages the insertion marker, but before the detection of the insertion selection.

The insertion menu preferably includes insertion labels corresponding, at least, to hard-to-recognize punctuation characters. However, the insertion menu preferably also includes at least one insertion label corresponding to a formatting character, such as a carriage return. In addition, the insertion menu can also include insertion labels corresponding to context-dependent strings and corresponding to abbreviations. The insertion menu is preferably displayed in a vertically and/or laterally displaced position relative to the insertion marker so that the insertion marker remains visible on the screen.

The insertion implementer retrieves an insertion string corresponding to a selection of an insertion label and inserts the string into a string of text information. The string of text information can include an existing collection of alphanumeric, formatting, and other characters, or it can be a null string. In the case of a null string, the "insertion" is starting a new string of text information. If the insertion label is context-dependent, the insertion implementer retrieves and inserts the appropriate context-dependent string. If the insertion label is an abbreviation, the insertion implementer retrieves a longer insertion string corresponding to the abbreviation-type insertion label, and inserts it into the string of text information.

A pen-based computer system with string inserter in accordance with the present invention includes a central processing unit (CPU), digital memory coupled to the CPU, a dual function display coupled to the CPU for displaying text on a screen and for receiving text inputs from the movement of a pointer over the screen, a mechanism for displaying an insertion marker on the screen, a mechanism for detecting an insertion selection of the insertion marker, a mechanism for displaying an insertion menu on the screen, a mechanism for detecting a selection of an insertion label of the insertion menu, and a mechanism for inserting an insertion string corresponding to the insertion label into the string of text information. The functionality of the pen-based computer system is preferably implemented with a combination of hardware and software, where the software resides in the digital memory to cause the hardware to provide the desired functionality.

A method for inserting an insertion string into a string of text information for a computer system having a graphical user interface and a pointer capable of interacting with the graphical user interface includes the steps of: a) displaying an insertion marker; b) detecting an selection of the insertion marker and providing an insertion menu in response thereto; and c) and detecting a selection of an insertion label on the insertion menu and inserting an insertion string corresponding to the selection into this string of text information. The method of the present invention is preferably accomplished with a combination of hardware and software in the form of a pen-based computer system.

A string inserter article of manufacture of the present invention includes a machine-readable medium and program instructions stored by the machine-readable medium. The program instructions include code related to the display of an insertion marker on a screen of a computer system having a graphical user interface, code related to the detection of a selection of the insertion marker and providing an insertion menu on the screen, code related to the detection of a selection of an insertion label of the insertion menu, and code relating to the insertion of an insertion string corresponding to the insertion label into a string of text information. A number of suitable machine-readable mediums includes, but is not limited to, floppy disks, hard disks, optical disks, read-only memory (ROM), random access memory (RAM), etc.

An advantage of the present invention is that hard-to-recognize characters, such as punctuation, can be easily and quickly inserted into a recognized string of text information. In addition, the present invention provides support for context-dependent characters (such as bullets and "curly quotes") and provides a convenient method for inserting long strings of text corresponding to an abbreviation label.

These and other advantages of the present invention will become apparent upon reading the following detailed descriptions and studying the various figures of the drawings.

DETAILED DESCRIPTION OF THE PREFERRED EMBODIMENTS

The present invention is well suited for pointer based computer systems such as the pen-based, pen-aware, mouse.

track ball, and track pad controlled systems that are currently popular. For the purposes of illustration, the invention will be described in connection with a pen-based system, although it will be appreciated that any type of computer utilizing a graphical user interface (GUI) and a pointer can be considered an equivalent in many instances.

Figure 1:
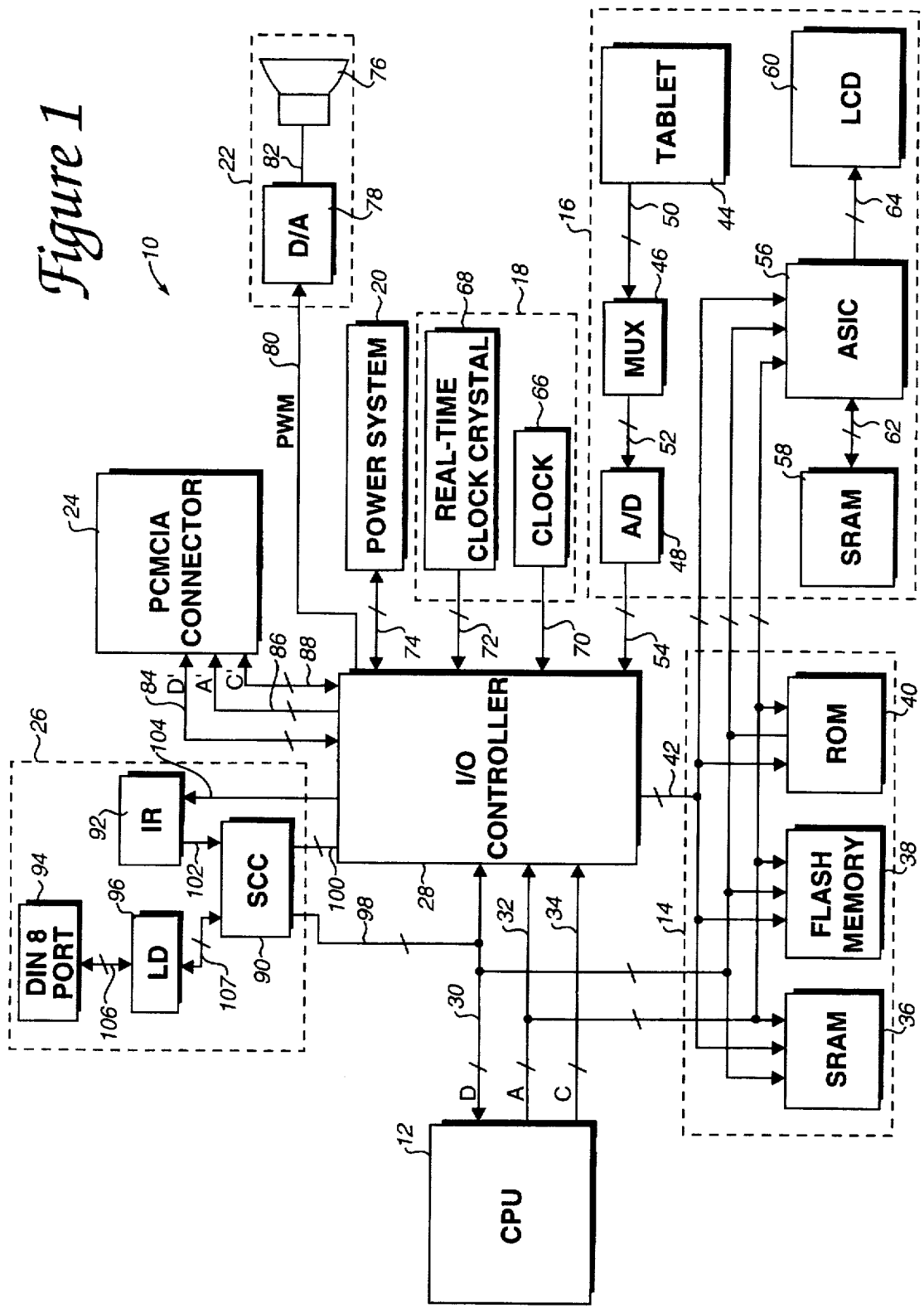
FIG. 1 is a block diagram of the electronics of a pen-based computer system in accordance with the present invention.

As shown in FIG. 1, a block diagram 10 of the electronics of a pen-based computer in accordance with the present invention includes a central processing unit (CPU) 12, a memory system 14, an input/output (I/O) dual function display system 16, a clock system 18, a power system 20, a sound system 22, a PCMCIA connector 24, and a serial I/O system 26. The various components and systems of the computer 10 are coupled together by an I/O controller 28 which serves as an interface between the CPU 12 and other components of the computer 10. More specifically, the I/O controller 28 is an application-specific integrated circuit (ASIC) designed to handle memory, peripherals, and I/O tasks, as well as housekeeping functions such as providing system clocks, controlling power usage, etc. The design, manufacture, and use of ASICs is well known to those skilled in the art. The pen-based computer 10 as illustrated is currently being manufactured and sold by Apple Computer, Inc. of Cupertino, Calif. as a Newton® 120 Personal Digital Assistant (PDA).

CPU 12 is preferably a commercially available, single chip microprocessor. While CPU 12 can be a complex instruction set computer (CISC) chip, it is preferable that CPU 12 be one of the commercially available, reduced instruction set computer (RISC) chips which are known to be of generally higher performance than CISC chips. In the present embodiment, the CPU 12 is preferably an ARM® 610 RISC chip operating at 20 megahertz and is available from a variety of sources including VLSI Technology, Inc. of San Jose, Calif. and Plessey Semiconductor of England. The present CPU 12 includes a 32 bit data (D) bus 30, a 32 bit address (A) bus 32, and an 8 bit control (C) bus 34.

The memory system 14 includes static random access memory (SRAM) 36, non-volatile read/write "flash" memory 38, and read-only memory (ROM) 40. The SRAM 36 serves as volatile "scratch pad" memory for the computer system 10 and, in the current system, includes 512 kilobytes of memory. The flash memory 38 is where user data is stored, preferably includes about 2 megabytes of memory, and is available as a standard product from Intel Corporation of Santa Clara, Calif. The ROM 40 stores the operating system and embedded application programs, and currently comprises approximately 8 megabytes of memory. Of course, there are many equivalents for the SRAM 36, flash memory 38, and ROM 40. For example, dynamic random access memory (DRAM) can be substituted for SRAM 36, battery-backed random accessed memory (RAM) can be substituted for flash memory 38, and a programmable read-only memory (PROM) can be substituted for the ROM 40.

The memory system 14 is coupled directly to the data (D) bus 30 and the address (A) bus 32. The memory system 14 is also coupled to a memory control bus 42 of controller 28. The CPU 12 and controller 28 cooperate to read and write data to the memory system 14 via the busses 30, 32, and 42.

The display system 16 serves as both an input device and an output device. More particularly, a tablet 44, multiplexer (MUX) 46, and analog-to-digital (A/D) converter 48 convert the contact of a stylus (see FIG. 2) with the tablet 44 and its subsequent movement over the tablet into digital data that is input to the controller 28. The tablet 44 is preferably a four-wire resistive membrane tablet and provides positional information on a bus 50 which is input into the MUX 46. The MUX 46 determines which of the four sides of the tablet is to be read. Such tablets are widely available from a variety of sources including Nissha of Japan. An output from the MUX 46 is input to A/D converter 48 on a bus 52. An output from the A/D converter 48 is input into the controller 28.

The display system 16 further includes an ASIC 56, a dedicated SRAM 58, and an LCD screen 60. The ASIC 56 is an LCD controller coupled to the data (D) bus 30, the address (A) bus 32, and the memory control bus 42. The purpose of the ASIC 56 is to allow the CPU 12 to write to the screen as if it were a RAM sitting on the memory bus 42. The SRAM 58 is coupled to the ASIC 56 by a dedicated bus 62, and the screen 60 is coupled to the ASIC 56 by a dedicated bus 64. The ASIC 56 serves as a controller for the screen 60, and uses the SRAM 58 as a frame buffer to store images to be displayed on the screen 60. The LCD screen 60 is preferably a standard super-twist LCD matrix screen available from a number of sources including Seiko-Epson of Japan. The LCD screen preferably comprises a rectangular array of picture elements or "pixels", as is well known to those skilled in the art.

The clock system 18 includes a main system clock 66 and a real-time clock (RTC) crystal 68. The main system clock is a four-terminal oscillator and is used to provide the master clock for the computer 10. In the present embodiment, the main system clock 66 operates at 40 megahertz. Oscillator clocks such as clock 66 can be commercially obtained from many sources including Seiko-Epson of Japan. This master clock may be divided down by the controller 28 for various timing purposes in the system, and is coupled to the controller 28 by a line 70.

The RTC crystal 68 is tuned to 32.768 kilohertz, which is evenly divisible by a power of 2. The RTC crystal 68 forms the basis of a crystal based oscillator that can provide a continuous, precise, uninterrupted signal at 1 hertz by dividing down the 32.768 kilohertz crystal signal with a 10 bit divider. The circuitry for performing this type of task is well-known, and form a part of controller 28 in this embodiment. The one hertz RTC signal increments a RTC counter (also a part of the controller 28) to count of the total number of seconds that has elapsed since midnight, Jan. 1, 1904 (an arbitrary start time). The value in the RTC counter can be converted into time of day and date information by relatively straight-forward calculations well known to those skilled in the art. Since the RTC crystal 68 is coupled to the controller 28 by a dedicated two-line bus 72 to provide the 32.768 kilohertz signal to the controller 28.

The power system 20 provides power to the computer 10 and is coupled to the controller 28 by a dedicated bi-directional bus 74. The bus 74 allows for the handling of fault detection signals (e.g. low power), switching on and off power to the PCMCIA connector, etc. The power system 20 preferably controls the power system 20 to conserve power at times of low usage of the pen-based computer system.

The sound system 22 includes a small (18 mm diameter) loudspeaker 76 and a D/A converter 78. The D/A converter 78 is coupled to the controller 28 by a line 80, and to the loudspeaker 76 by a line 82. In the present embodiment, the D/A converter 78 is a simple operational amplifier (OP AMP) which acts as an integrator to integrate pulse width modulation (PWM) signals developed on line 80 to provide an analog signal on line 82 to drive loudspeaker 76. Of course, more complex D/A converters can also be used to provide higher quality sound output from loudspeaker 76, as will be apparent to those skilled in the art. Suitable OP AMPS to be used as a D/A converter 78 are readily available on the commercial market, and the miniature loudspeaker is also readily available, such as from Hosiden of Osaka, Japan.

The PCMCIA connector 24 is coupled to the controller 28 by a dedicated data (D') bus 84, a dedicated address (A') bus 86, and a dedicated control (C') bus 88. The PCMCIA specifications for signals on the dedicated data, address, and control busses are industry standard and highly available as the "PC Card" or "PCMCIA" standard. A variety of devices can fit in the PCMCIA slot 24, including memory expansion cards, miniature hard disk drive cards, modem cards, and pager cards, to name a few.

The serial I/O system 26 includes a Serial Communications Controller (SCC) 90, an infrared (IR) transceiver 92, a serial port 94, and a line driver (LD) 96. The SCC 90 is coupled to the data bus (D) 30 by a bus 98 and to the controller 28 by a bus 100. A suitable SCC 90 can be purchased from Zilog Corporation of San Jose, Calif. as part number Z85C30. The Zilog Z85C30 has been available since at least the early 1980's and supports a number of serial protocols. The IR transceiver 92 is coupled to the SCC 90 by a line 102 for received IR signals, and to the controller 28 for IR signals to be transmitted. The IR transceiver includes an IR transmitter (coupled to line 104) and an IR receiver (coupled to line 102), and is available under license from Sharp Corporation of Japan. The IR receiver includes a PIN-type IR-sensitive diode having an output coupled to an analog demodulator and an amplifier to create a signal on line 102, an IR LED coupled to line 104 to be directly driven by a high-power switch of controller 28. The serial port 94 is a standard DIN 8 (8 pin) connector, and is coupled to the line driver LD 96 by an eight bit bus 106. The LD 96 is coupled to the SCC 90 by a bus 107.

Figure 2:
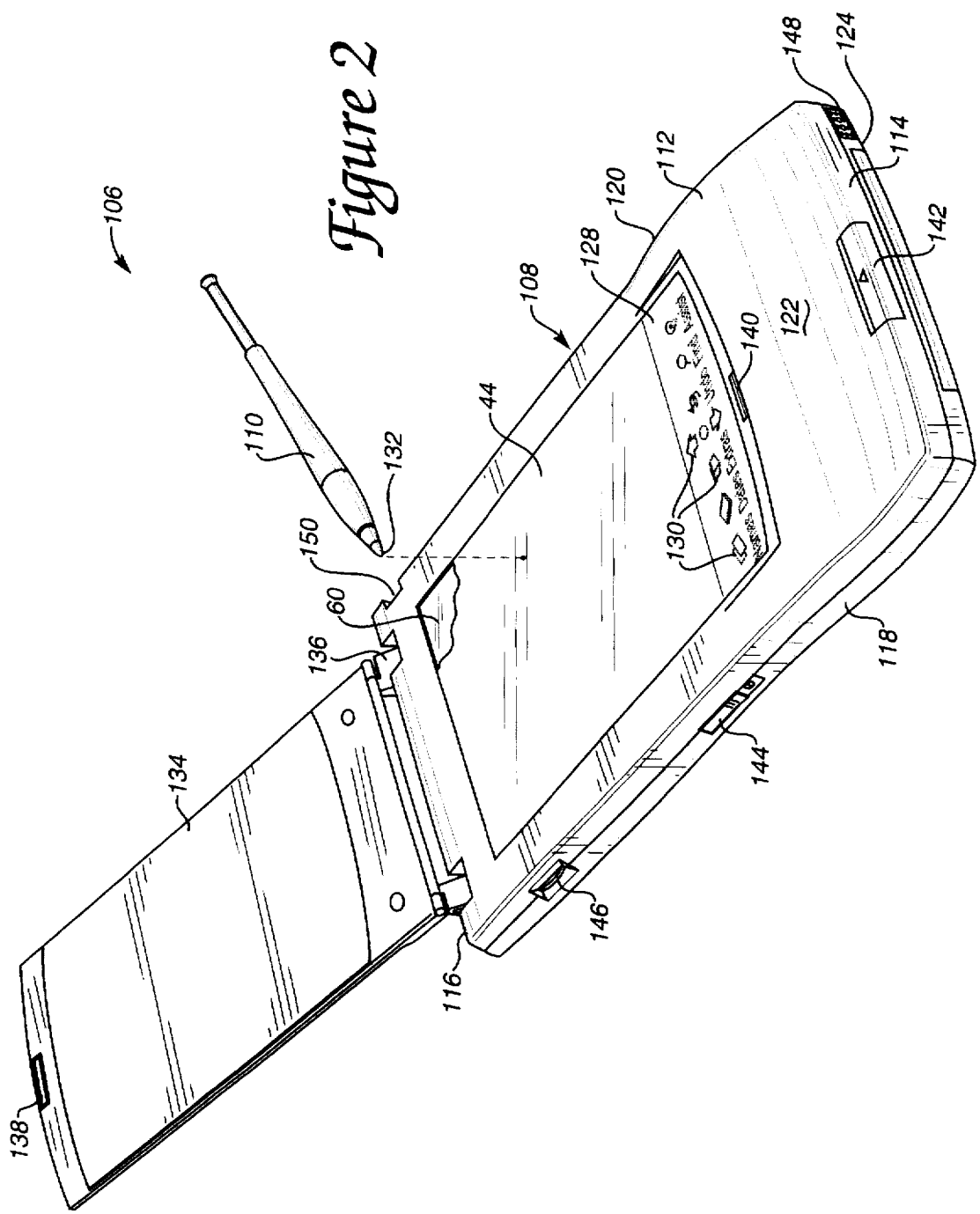
FIG. 2 is a perspective view of a pen-based computer system including a housing, display assembly, and stylus, where the electronics of FIG. 1 are enclosed within the housing.

Referring now to FIG. 2, a pen based computer system 106 in accordance with the present invention includes the computer 108 and a pen or stylus 110. The computer 108 is enclosed within a generally flat, rectangular case 112 having a front end 114, a back end 116, a left side 118, a right side 120, a top 122, and a bottom 124. The LCD 60 is positioned along the top 122 of the case 112, and the clear membrane tablet 44 is positioned over the LCD 60. Also positioned beneath the tablet 44 along a lower edge 126 thereof, is a printed strip of material 128 including a number of indicia 130. When the tip 132 of the stylus 110 is engaged with the membrane 44 over one of the indicia 130, the computer 108 can respond to the contact as if the indicia were a "button." Therefore, as used herein, a "button" can be an image seen through the tablet 44 (either from the screen 60 or from printed material 128 or the like) that can serve the function of an electro-mechanical button or the like when the tablet 44 is activated over a button image.

A lid 134 is connected to the back end 116 of case 112 by hinge 136. When open as shown or folded back to contact the bottom 124 of case 112, the tablet 44 and screen 60 are available for use. When the cover 134 is folded over the top 122 of case 112, it fully covers the tablet 44 to protect the delicate membrane material. The lid 134 is provided with a latch member 138 which engages a latch member 140 when it is overlying the top 122 of the computer. The latch member 138 is disengaged from the latch member 140 by a mechanical latch release 142.

Also seen in FIG. 2 is an "on" switch 144, a contrast adjustment 146, and a grille 148 for the speaker 76. The stylus 110 is of a collapsible design and can fit into an opening 150 along the right side 120 of case 112. Not seen in this figure along the right side 120 of the case 112 is an opening for a PCMCIA card which can engage PCMCIA connector 24, the DIN 8 port 94, and a power input jack. Not seen along the bottom 124 of the case 112 is a battery access cover and a mechanical ejection button for a PCMCIA card engaged with the PCMCIA connector 24. The IR port 92 is provided along back 116 of the case 112 and is exposed for use when the cover 134 is folded against the bottom 124 of the case 112. The remaining components and systems of the computer block diagram 10 of FIG. 1 are enclosed within the case 112 of the computer system 108.

It should be noted that the preceding discussion is of a preferred embodiment of the present invention, and that there are many alternatives for the stylus 110. For example, a fingernail or other pointed object could be used with the tablet 44 of the present invention. Also, there are other types of tablets available that utilize other types of styluses.

Other types of pointing devices can also be used in conjunction with the present invention. While the method of the present invention is described in the context of a pen-based system, other pointing devices such as a computer mouse, a track ball, a track pad, a tablet, etc. can be used to manipulate a pointer on a screen of a general purpose computer. Therefore, as used herein, the terms "pointer", "pointing device", "pointing apparatus", "pointing means", and the like will refer to any mechanism, device, or system for designating to a particular location on a screen of a computer display.

Figure 3:
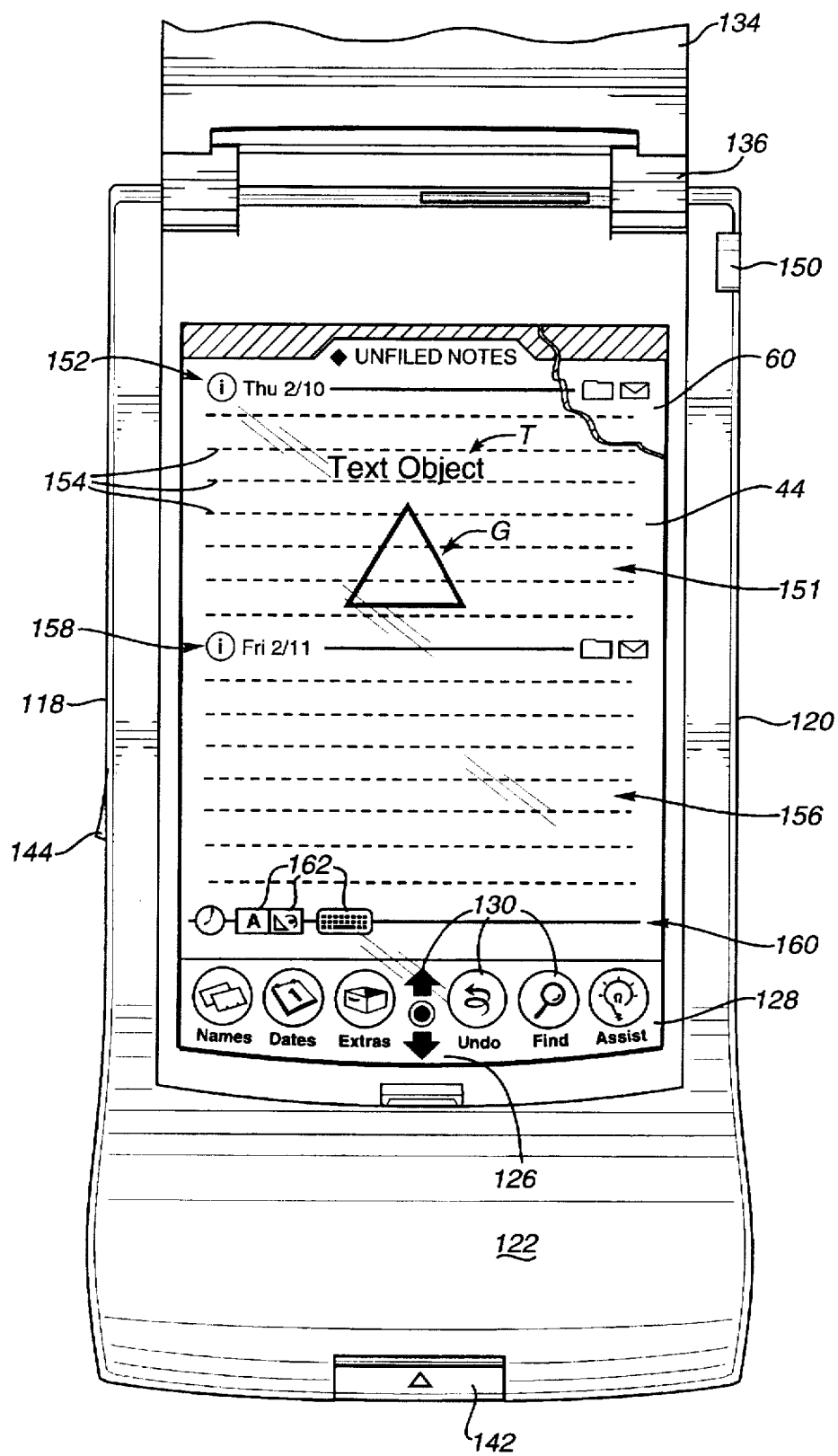
FIG. 3 is a top plan view of the housing and display assembly of pen-based computer system of FIG. 2.

With additional reference to FIG. 3, information is input into the pen-based computer system by "writing" on the tablet 44 with stylus 110 or the like. Information concerning the location of the tip 132 of stylus 110 on the tablet 44 of the display system 16 is input into the CPU 12 via the controller 28. Typically, this information comprises the Cartesian (i.e. x & y) coordinates of a pixel of the screen 60 over which the tip 132 of the stylus 110 is positioned. The CPU 12 then processes the data under control of an operating system (stored in ROM 40) and possibly an application program stored in the memory system 14 or elsewhere (such as on a PCMCIA card engaged with PCMCIA connector 24). The CPU 12 next produces data which is transferred to the screen 60 via ASIC 56 to produce appropriate images on the screen.

Upon power-up, pen based computer system 106 displays on screen 60 an initial "note" area 151 including a header bar 152 and a number of guidelines 154. The header bar 152 preferably includes the date of creation of the note area 151 and a number of icons and "soft" buttons, not particularly germane to the discussion of the present invention. The guidelines 154 aid a user in entering text, graphics, and data into the pen-based computer system 106. A text object T of the text "Text Object" and a graphic object G of a triangle are shown as being entered within note area 151.

Additional note areas, such as a second note area 156, can be formed by the user by drawing a substantially horizontal line across the tablet 44 with the stylus 110. The substantially horizontal line is recognized by the computer system 106 and is converted into a second header bar 158. Additional text, graphical, and other data can then be entered into this second note area 156.

The screen illustrated in FIG. 3 is referred to as the "notepad", and is preferably an application program running under the operating system of the pen based computer system 10. In this preferred embodiment, the notepad is a special or "base" application which is usually or normally available beneath higher level applications. The notepad application, like other applications, run within a window, which in this instance comprises the entire screen 60. Therefore, as used herein, a "window" is the entire screen or any portion of an entire screen which is dedicated to a particular application program. A description of the operation and use of the notepad can be found in U.S. Pat. No. 5,398,310, assigned to the assignee of the present invention, and incorporated herein by reference.

A status bar 160 is provided at the bottom of the notepad application. The status bar 160 is provided with a number of active areas and a number of display areas, which again are not particularly germane to the present invention and will therefore not be discussed in detail herein.

The term "object" will be used extensively in the following discussions. As is well known to software developers, an "object" is a logical software unit comprising data and processes which give it capabilities and attributes. For example, an object can be queried as to its type and can return such data as the number of words that it contains, what its bounding box (BBOX) is, etc. Objects can contain other objects of the same or of a different type. Objects can also be used to project images on a screen according to their object type. Example of object types used in the following description include paragraph, line, and word objects. There are many well known texts which describe object oriented programming. See, for example, *Object Oriented Programming for the Macintosh*, by Kurt J. Schmucher, Hayden Book Company, 1986.

In the present invention, objects may be implemented as part of a frame system that comprises frame objects related by a semantic network. A description of semantic networks can be found in "A Fundamental Tradeoff in Knowledge Representation and Reasoning", *Readings in Knowledge Representation*, by Brachman and Leveseque, Morgan Kaufman, San Mateo, 1985.

It will be noted there is a liberal use of graphic elements in the present invention. For example, the header bars 152 and 158 include lines and other graphical elements. Processes for drawing lines on a computer screen are well known to those skilled in the art. For example, graphics software such as QUICKDRAW from Apple Computer, Inc. of Cupertino, Calif. can be used to draw lines, simple geometrical shapes, etc. A description of the QUICKDRAW graphics software is found in the book *Inside Macintosh, Volumes I, II and III*, by C. Rose et al., Addison-Wesley Publishing Company, Inc., July 1988. With such graphics software, a line can be drawn by simply specifying the coordinates of the beginning and the end of the line, and by specifying the width of the line.

Another preferred tool for implementing the system of the present invention is a view system. Various types of view systems are well known to those skilled in the art. In the present system, the notepad application on the screen 60 can form a first or "root" layer, with the status bar 160, for example, positioned in a second layer "over" the root layer. The various buttons 162 of the status bar 160 are positioned in a third layer "over" the second and root layers. The view system automatically handles "taps" and other gestures of the stylus 110 on the screen 60 by returning information concerning the tap or gesture and any object to which it may be related. U.S. patent application Ser. No. 07/976,970 filed Nov. 16, 1992 on behalf of Foster et. al, entitled "Status Bar for Application Windows" and assigned to the assignee of the present invention describes a preferred view system and how to make and use the status bar, and is incorporated herein by reference.

The object oriented programming and view system software makes the implementation of the processes of the present invention less cumbersome than traditional programming techniques. However, the processes of the present invention can also be implemented in alternative fashions, as will be well appreciated by those skilled in the art.

Figure 4A:
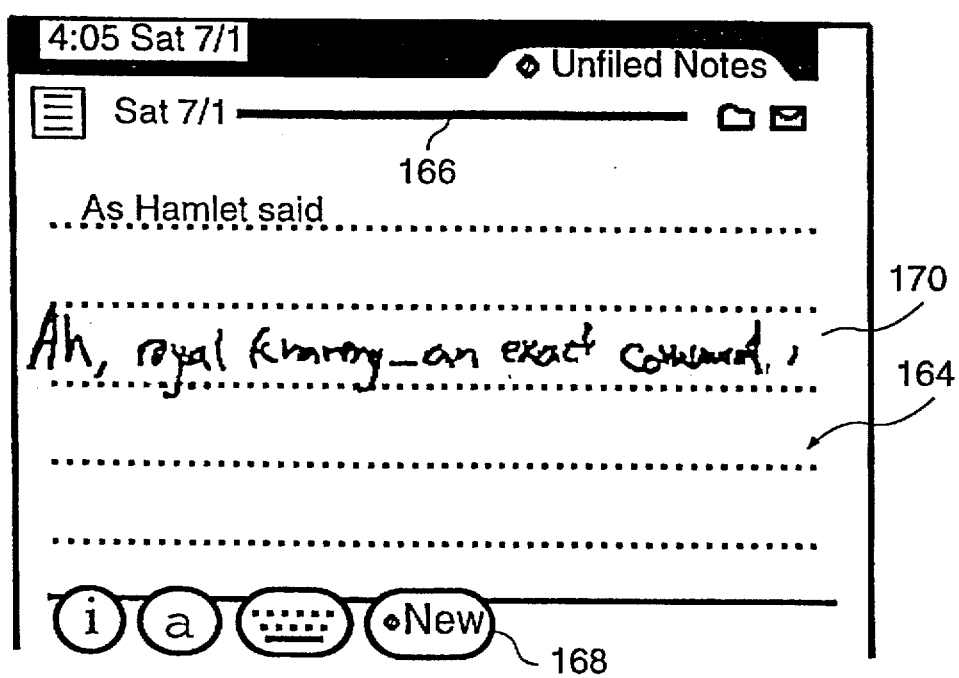
FIG. 4a is an illustration of a screen displaying a handwritten ("ink") input.

In FIG. 4a, a note area 164 is illustrated. It should be noted that this note area 164 is associated with a header bar 166 and a status bar 168 that are slightly different than the header bar 152 and the status bar 160 described previously with reference to FIG. 2. It is therefore clear that the exact configurations and functionality of the note areas, header bars, and status bars can be varied, as will be appreciated by those skilled in the art.

In FIG. 4a, handwritten electronic "ink" 170 has been entered by means of a stylus into the pen-based computer system. The handwritten text was meant to be recognized as "Ah, royal knavery-an exact command.". However, due to the difficulty in recognizing punctuation, in particular, the ink was recognized imperfectly. Text recognizers of handwritten ink are very well known to those skilled in the art, and are available from a variety of sources.

Figure 4B:
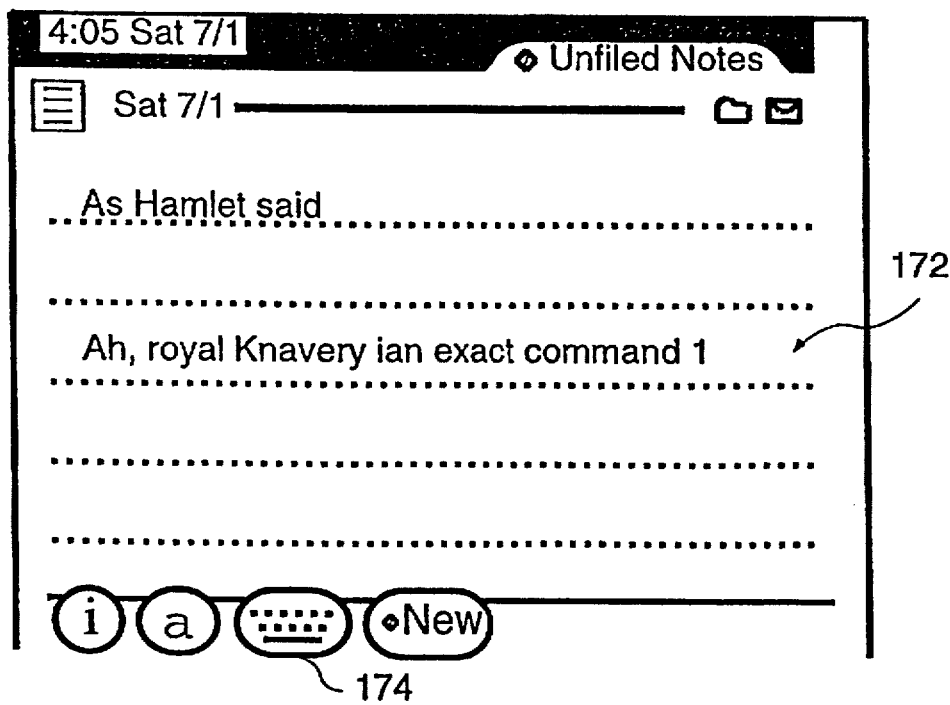
FIG. 4b is an illustration of a screen display where an imperfect recognition of the handwritten input resulted in several recognition errors.

In FIG. 4b, the recognized ink is replaced by "recognized" text 172. As noted, the recognition can be less-than-perfect, especially with punctuation. For example, the comma after the word "Ah" was misrecognized as a right parenthesis, the hyphen between "knavery" and "an" was misrecognized as a "i", and the comma after "command" was misrecognized as the number 1. As noted, in the past, a keyboard-like interface could be activated, such as with an icon 174, so that the misrecognized characters of text 172 could be corrected. This method of correction is, in some circumstances, less convenient than it needs to be in view of the present invention.

Figure 5A:
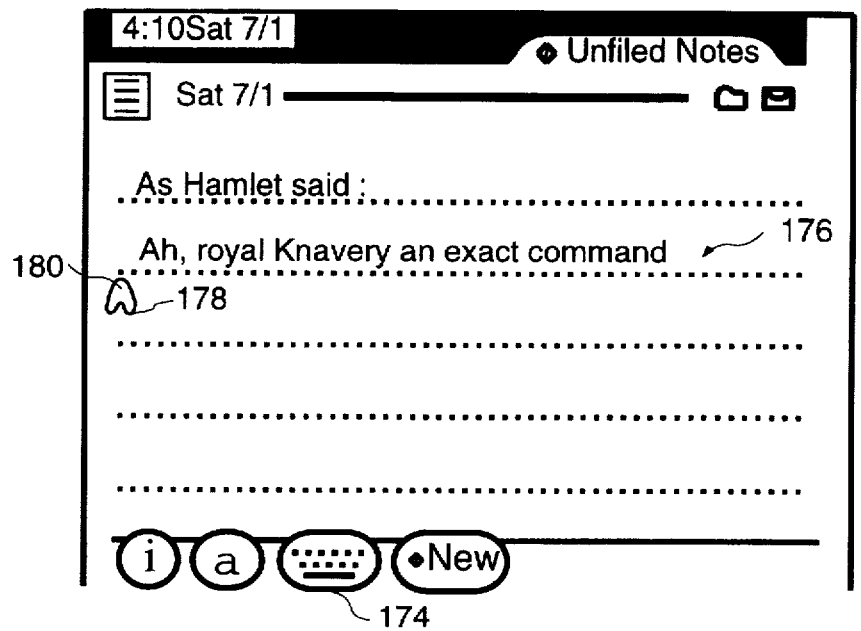
FIG. 5a illustrates another screen display where a handwritten input without punctuation has been correctly recognized, and wherein an insertion selection of an insertion marker has been made.

In FIG. 5a, recognized text 176 has been input without punctuation for the purpose of this example. The recognized text 176 could have been input as handwritten ink, and then subsequently recognized, or it could have been input by another mechanism such as through a pseudo keyboard, through the serial I/O system 26, or by any other mechanism. In any event, the text string 176 needs to be punctuated. As an alternative to using the pseudo keyboard (as could be activated with icon 174) to provide punctuation, a "caret" insertion marker 178 of the present invention can be used to activate a pop-up insertion menu that allows the efficient insertion of the proper punctuation.

Figure 5B:
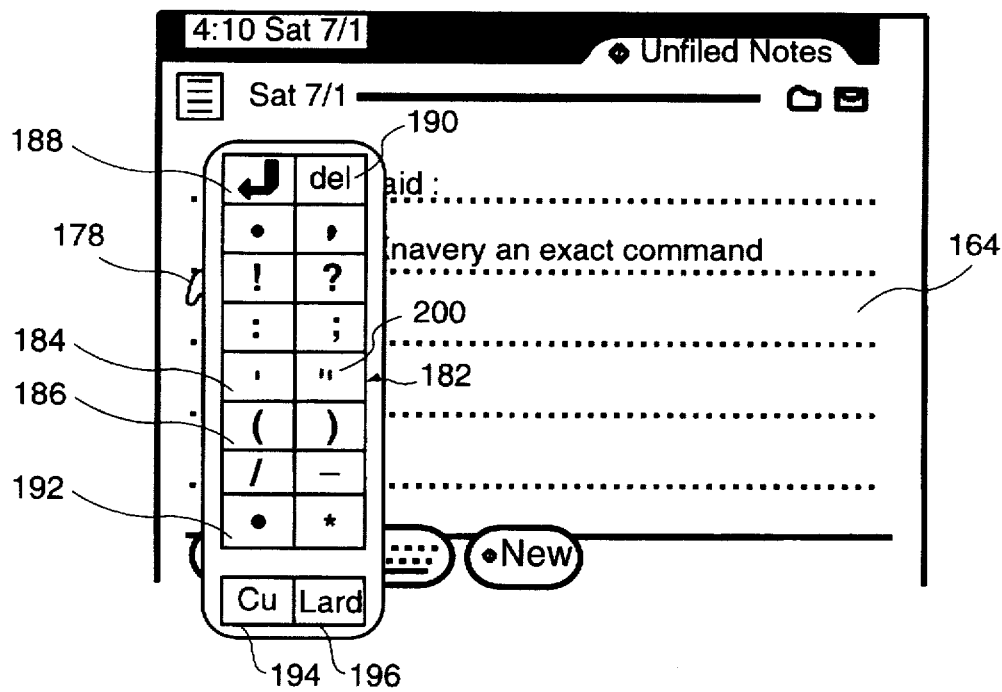
FIG. 5b illustrates the display of an insertion menu on the computer screen.

With continuing reference to FIG. 5a, the caret 178 has been engaged with the stylus (not shown) of the pen-based computer system at a point 180. This causes a change in the image of the caret from a solid black caret (as seen, for example, in FIG. 5b) to the outline of a caret as seen in FIG. 5a. In other words, visual user feedback of the selection of the caret is preferably provided. After the stylus has been released from the caret of FIG. 5a, an insertion menu 182 is displayed over the note area 164 in a preferably laterally displaced position. This activation sequence of putting the stylus tip down over the caret and then picking it up from the caret will be referred to as a "tap" and causes (in this case) the computer system to recognize that an insertion selection has been made, thereby initiating a process that results in the display of the insertion menu on the screen. The process of making a tap will be referred to as "tapping."

It should be noted that the insertion menu 182 includes a number of different types of insertion strings. For example, the insertion menu 182 includes hard-to-recognize punctuation such as an apostrophe 184 and a parenthesis 186. In addition, the insertion menu 182 includes a formatting character 188 (a carriage return), an editing button 190 (a delete key), a context-sensitive character 192 (a "bullet"), and two exemplary abbreviation labels at 194 and 196. All of these various characters and buttons, described herein by way of example, are referred herein to as "insertion labels" in that they are labels for insertion strings to be inserted into (or otherwise manipulating) a string of text information in the pen-based computer system.

It should be noted that the string of text information can include (but is not limited to) an existing ordered sequence of alphanumeric, formatting, or other characters (both visible and invisible). The string of text information can also include unrecognized "ink." Alternatively, the string of text information can be a null string. In the case of a null string, the "insertion" of the present invention will start a new string of text information.

Figure 5C:
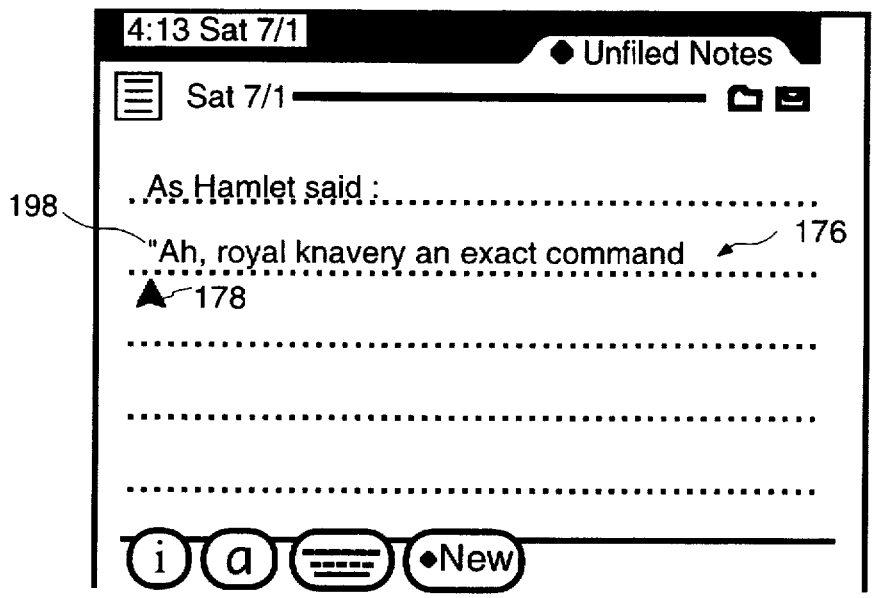
FIG. 5c illustrates the insertion of a double quote punctuation mark (non-context dependent) into the string of text information.

In FIG. 5c, the text 176 is now shown with the insertion of the a quote mark 198. This was accomplished by engaging the insertion label 200 of the insertion menu 182 of FIG. 5b with the tip of the stylus. The character 198 is inserted at an insertion point in the string of text information corresponding to the position of the caret 178 in the text 176. The text 176 on the screen is automatically updated on the screen to correspond to the newly revised string of text information.

Figure 5D:
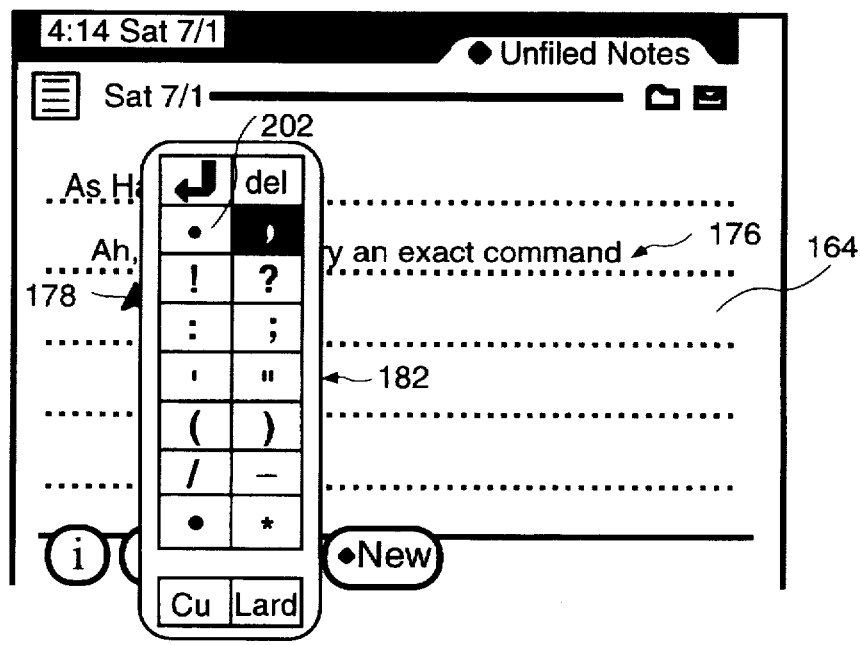
FIG. 5d illustrates the insertion of a comma into the string of text information.

As seen in FIG. 5d, the insertion marker or caret 178 has been repositioned to follow the letter "h" in the word "Ah." The repositioning of the caret can be accomplished by a number of conventional methods. For example, the caret can jump to a new position by tapping on the screen at the desired new position, or the caret can be "dragged" to a new position with the stylus, or an "arrow" key from a real or pseudo keyboard can be used to move the caret. In this example, the label 202 for a comma has been activated by the stylus for the pen-based computer system, causing the label 202 to be shown in reverse video. Upon after the activation of the label 202, insertion me nu 182 is preferably automatically removed from the note area 164. Alternatively, the insertion me nu 182 can remain on the screen for additional insertions at the insertion point.

Figure 5E:
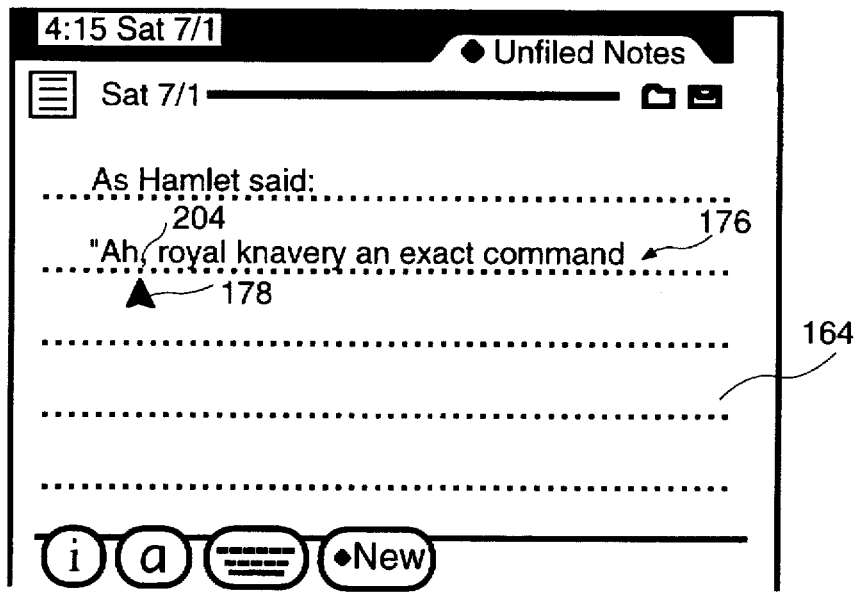
FIG. 5e illustrates the screen display after the comma has been inserted.
Figure 5F:
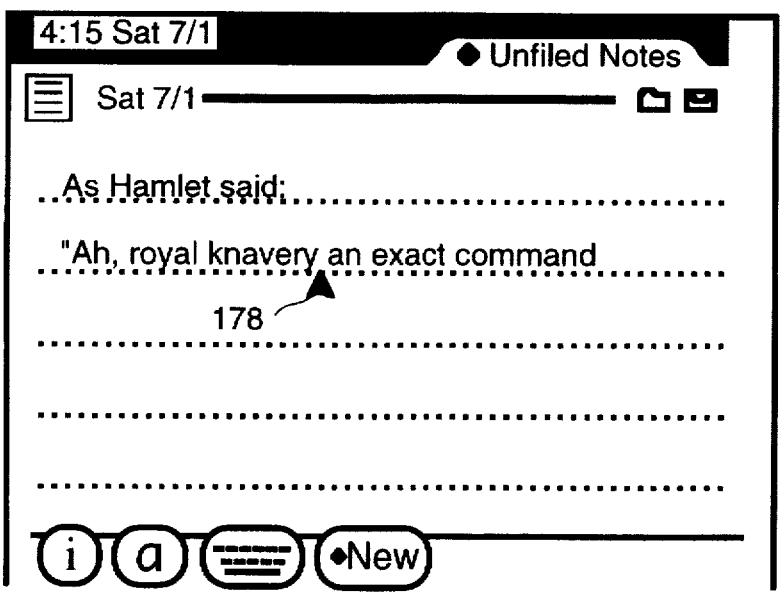
FIG. 5f illustrates the repositioning of the insertion marker on the screen to a different point in the string of text information.

In FIG. 5e, a comma 204 has been added to the text 176, i.e., it has been inserted into the string of text information stored in the pen-based computer system which corresponds to the text 176 displayed in note area 164. Next, as seen in FIG. 5f, the caret 178 has been repositioned just before the word "an".

Figure 5G:
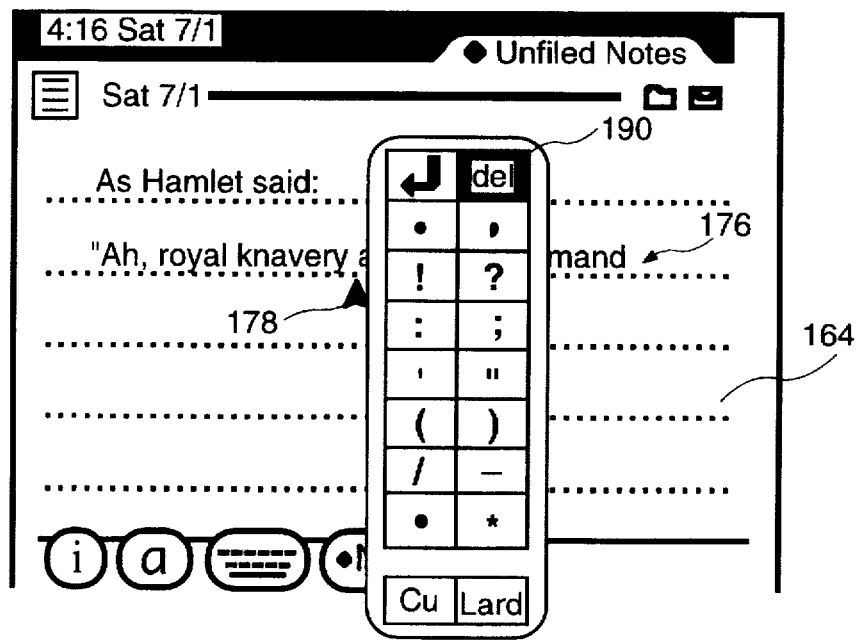
FIG. 5g illustrates the use of a text editing command to remove a space from the string of text information.
Figure 5H:
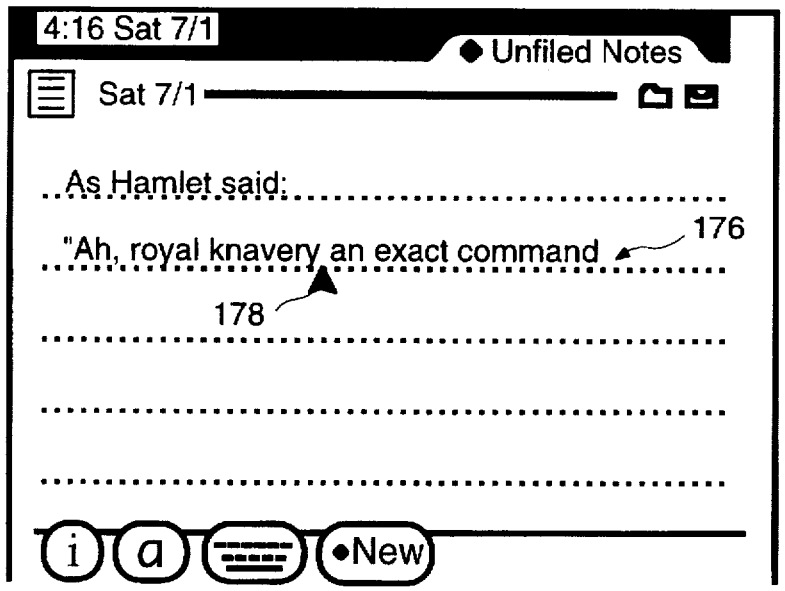
FIG. 5h illustrates the string of text information after the space has been removed.

In FIG. 5g, the insertion menu 182 is redisplayed on the note area 164 by tapping on the caret 178. Note that the insertion menu 182 is laterally displaced from the caret 178 so that the caret 178 remains visible. This lateral displacement can be either to the right (as shown) or to the left of the caret, depending upon the position of the caret in the text 176 and upon user preference. Alternatively, the displacement could be in the vertical direction (i.e. either above or below the insertion marker), although this is not a preferred in that there is a less intuitive connection between the insertion menu and the insertion marker. The editing button 190 is then engaged with the stylus of the pen-based computer system to cause the space before the word "an" to be deleted. This result is indicated in FIG. 5h where the text 176 no longer has a space between the word "knavery" and the word "an." The insertion marker or caret 178 points between the letter "y" in "knavery" and the letter "a" in the word "an."

Figure 5I:
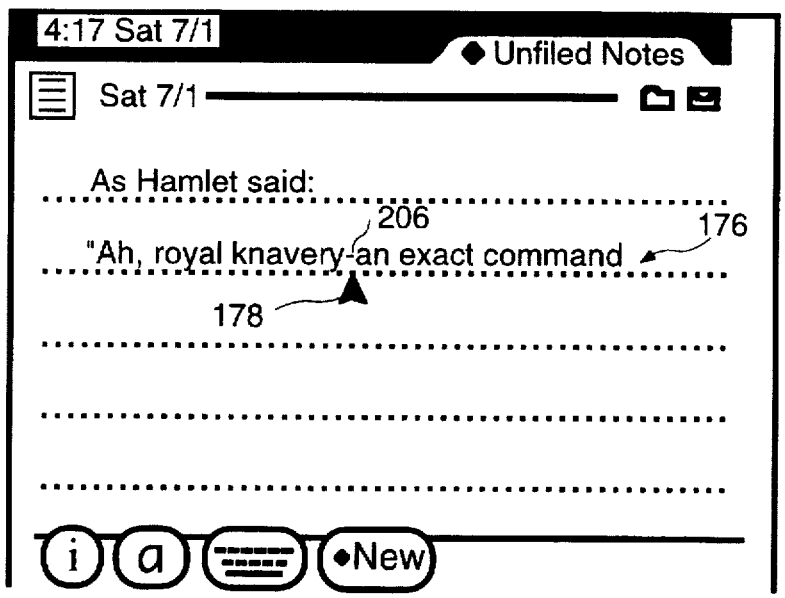
FIG. 5i illustrates the string of text information after a hyphen has been inserted.
Figure 5J:
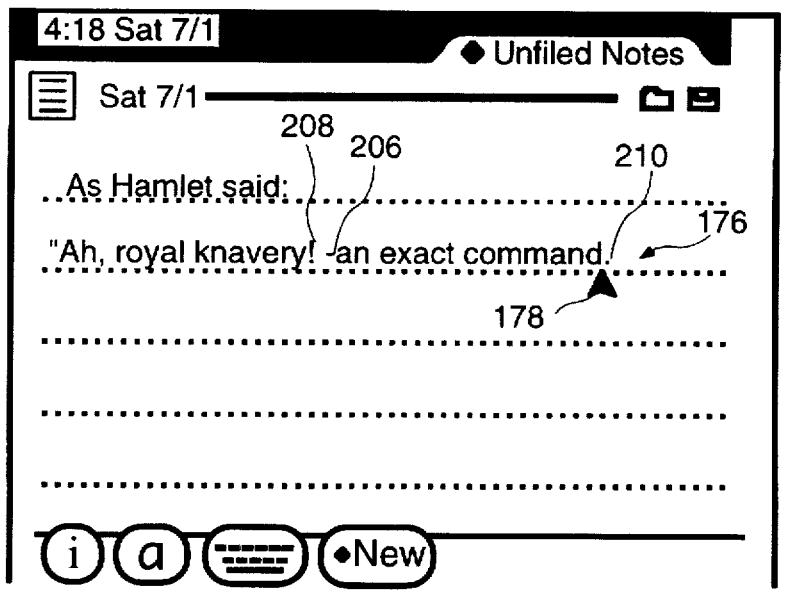
FIG. 5j illustrates the string of text information after the hyphen and an exclamation point has been inserted, and after the insertion marker has been moved.
Figure 5K:
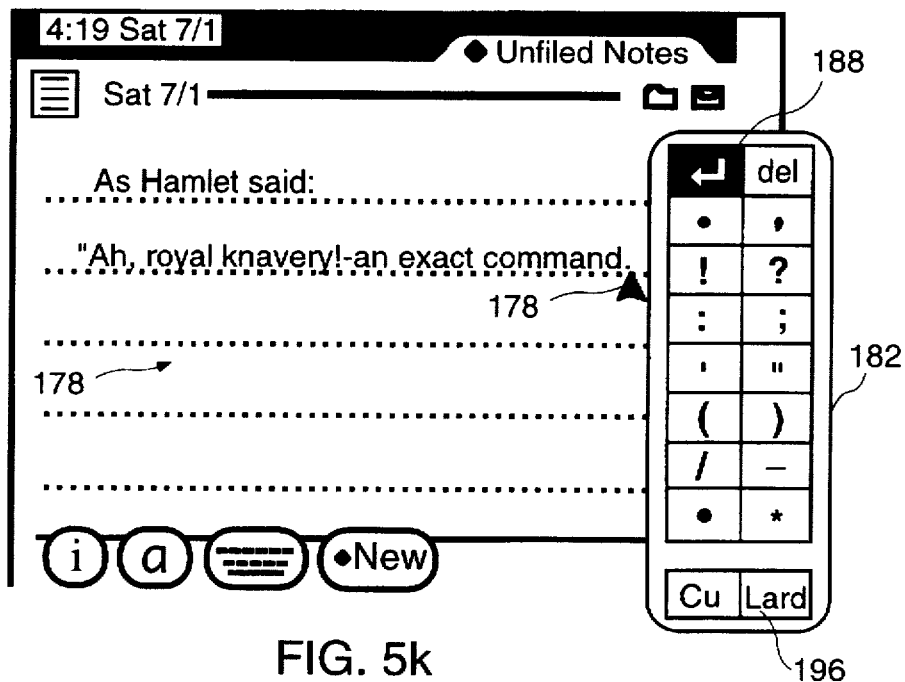
FIG. 5k illustrates the insertion of a format character into the string of text information.

In FIG. 5i, the aforementioned process is used to insert a hyphen 206 between the words "knavery" and "an." In FIG. 5j, the aforementioned processes used to insert an exclamation point 208 and a period 210 after the word "command." In FIG. 5k, the insertion menu 182 can be seen in the note area 164 immediately to the right of the caret 178. In this instance, the format character carriage return ("<CR>" or "↵") 188 has been engaged with the tip of the stylus of the pen-based computer system, as indicated in reverse video. This can result in insertion of the carriage return character <CR> into the string of text information.

Figure 5L:
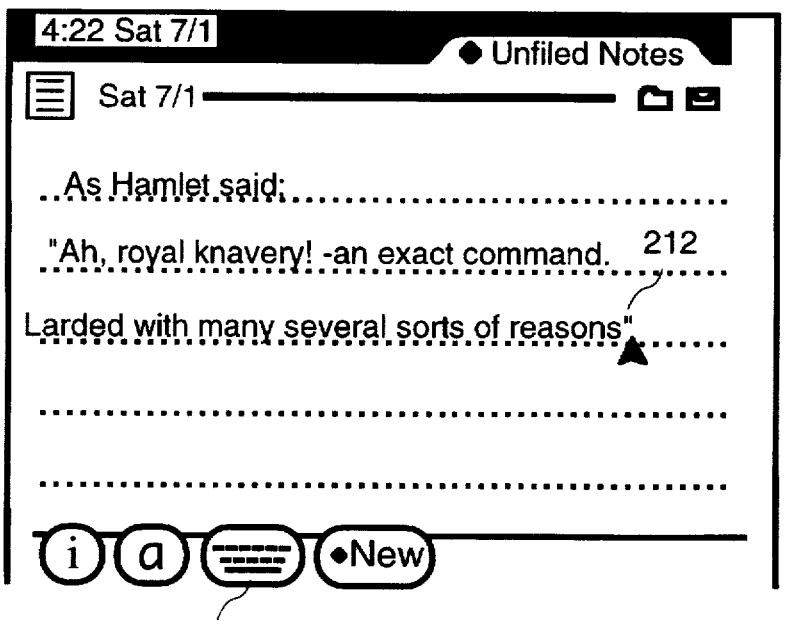
FIG. 5l illustrates the displayed text corresponding to the string of text information after a long string has been inserted.

As seen in FIG. 5l, the long string insertion "Larded with many several sorts of reasons" string has been inserted after the <CR> following the word "command." This long string "Larded with many several sorts of reasons" can be inserted by the recognition of handwritten "ink", by the use of a pop-up keyboard activated by the icon 174 or, preferably, by the use of an "abbreviation" label 196. It should be noted that the abbreviation labels are not abbreviations, per se, but, rather, short labels corresponding to longer strings. However, these short labels will be referred to herein synonymously as "abbreviations." In the present example, the pressing of the abbreviation label 196 ("Lard"), will result in the insertion of the long string "Larded with many several sorts of reasons". FIG. 5l also shows the insertion of the double quote 212 after the word "reasons".

Figure 6:
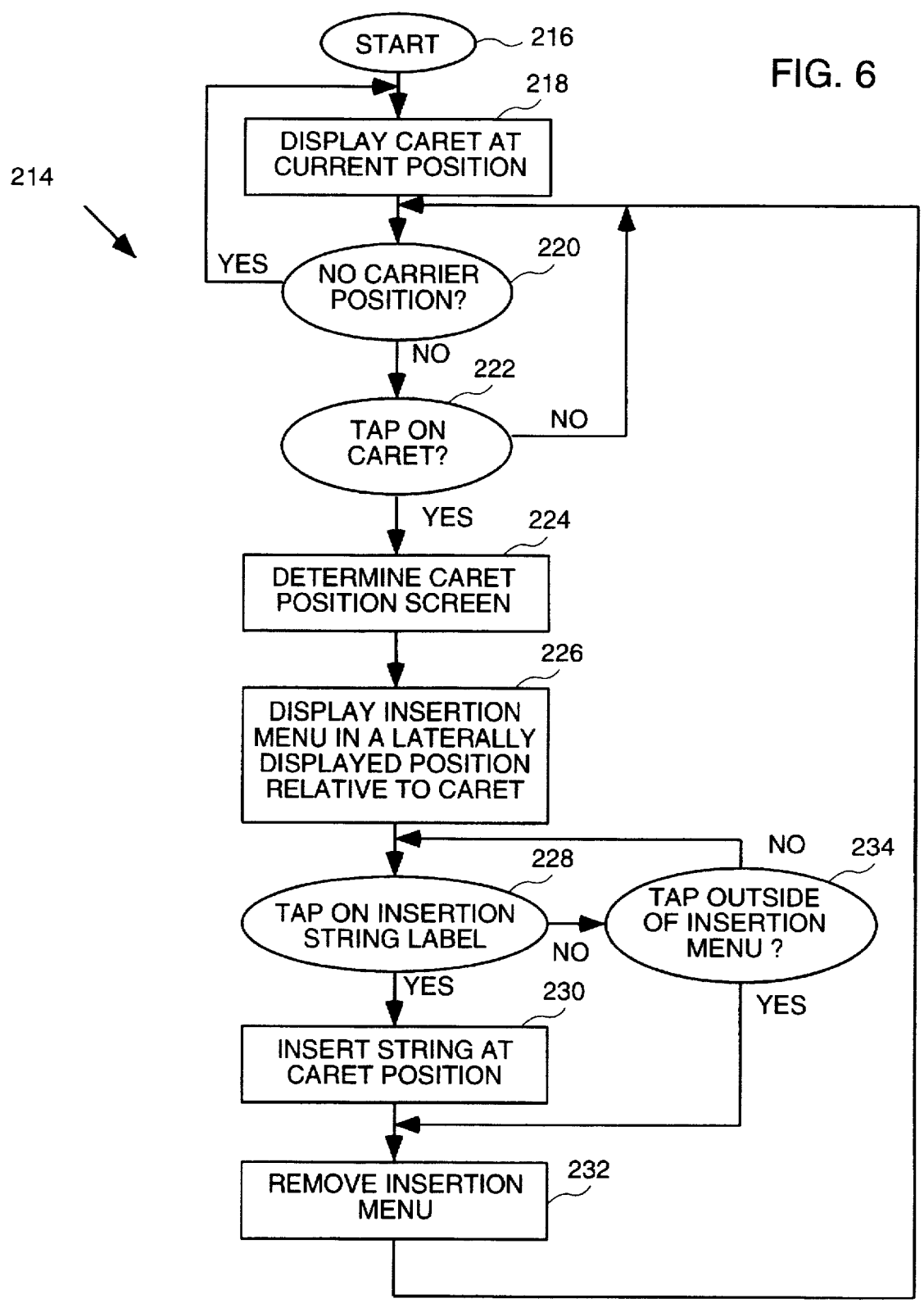
FIG. 6 is a flow-diagram of a method of string insertion in accordance with the present invention.

A method 214 in accordance with the present invention for inserting an insertion string into a string of text information is illustrated in FIG. 6. The process 214 begins at 216 and, in a step 218, a caret or other insertion marker is displayed at the current position of a text area on the computer screen. A decision step 202 determines whether this is a new position for the caret. If yes, process control is returned to step 218 to display the caret at the new current position. If it is not a new caret position, the decision step 222 determines whether there is a tap on the caret. By "tap" it is meant herein that the tip of a stylus is engaged with the caret, and then lifted from the caret, as described previously. As will be explained subsequently, this "engagement" is preferably determined using the convention of a "bounding box" around the caret. If the tip of the stylus taps within the bounding box (including a possible buffer region), then it has "tapped" the caret.

If there is no tap on the caret, process control is returned to step 220. If there is a tap on the caret, process control is transferred to step 224 to determine the caret position on the screen. This can be accomplished by a simple inquiry to the computer system. Next, in a step 226, the insertion menu is displayed on the screen in a laterally displaced position relative to the caret. The insertion menu is preferably laterally displaced so that the point of insertion into the text can be clearly seen by the user. Alternatively, it need not be displaced, or it could be additionally or alternatively be vertically displaced.

Next, in a decision step 228, there is a determination whether there is a tap on the insertion item. Consistent with previous explanations, a tap on an item includes placing the tip of a stylus on the item and then removing the stylus from over the item (i.e., from the input tablet), while it is still within perimeter of a bounding box of that item. If there was a tap on an insertion label, the item is inserted at the caret position in a step 230 and the insertion menu is removed at a step 232. Process control is then returned to step 220 to await a new caret position or a new tap on the caret. If step 228 determines that there is not a tap on an insertion label, it is determined in a step 234 if there is a tap outside of the insertion menu. If not, process control is returned to step 228. If there is a tap outside of the insertion menu, this is an indication that the user no longer wants the insertion menu and process control is turned over to step 232. Again, after the completion of step 232 (removal of the insertion menu), process control is returned to step 220.

Figure 7:
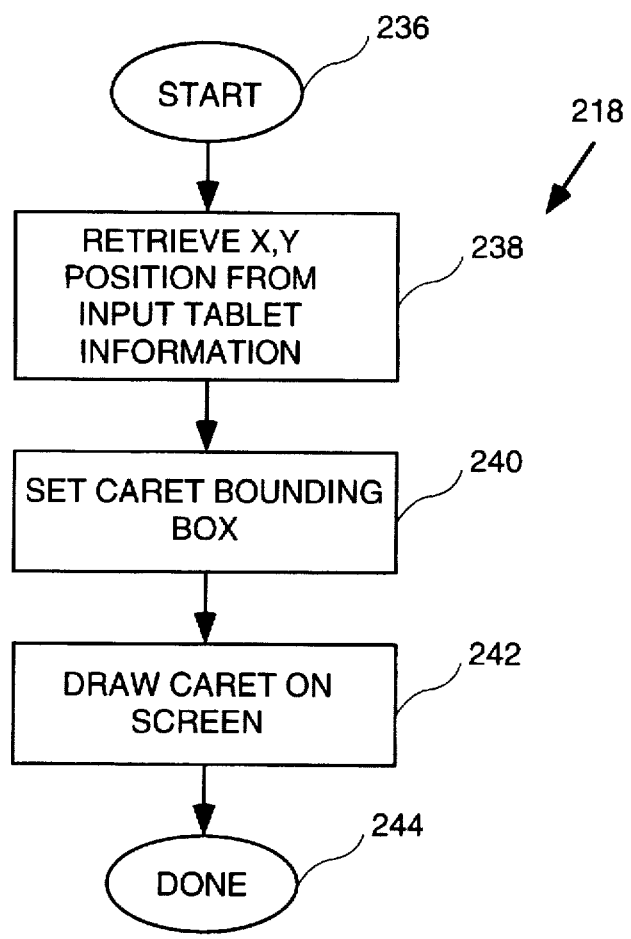
FIG. 7 is a flow-diagram of the "DISPLAY CARET AT CURRENT POSITION" step of FIG. 6.

In FIG. 7, step 218 of FIG. 6 will be described in greater detail. More particularly, process 218 begins at 236 and, in a step 238, the X, Y position of the tip of the stylus on the dual-function screen of the pen-based computer system is retrieved from input tablet information. Next, a bounding box is set for the caret in a step 240, and, in a step 242, the caret is drawn on the screen. The process is then completed as indicated at 244.

Figure 7A:
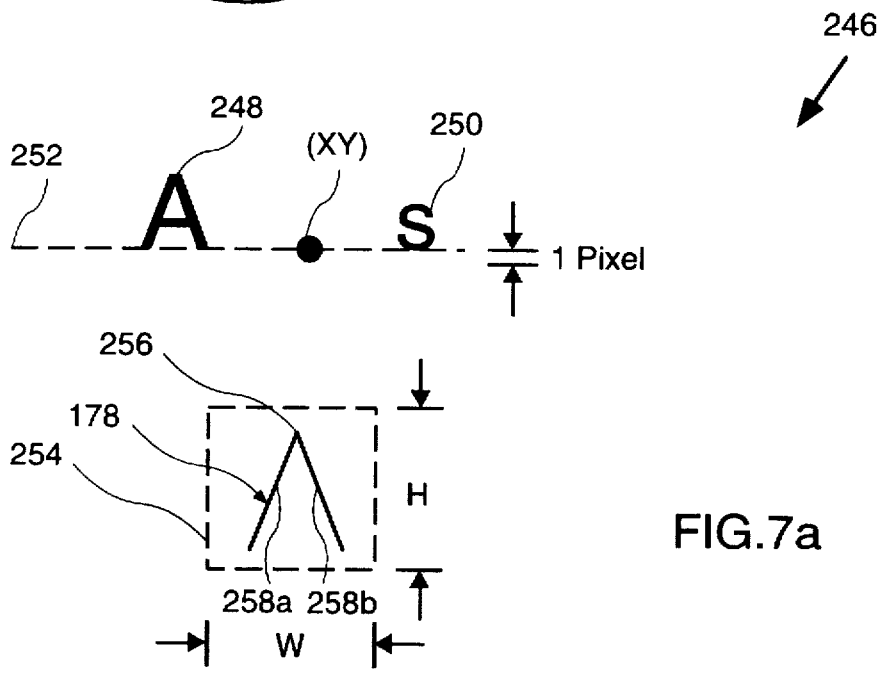
FIG. 7a is used to illustrate the process of FIG. 7.

In FIG. 7a, an illustration 246 will be used to help further explain the process 218 of FIG. 7. Assume that there is the short string "As" of a displayed text. More particularly, a letter 248 of "A" and the letter 250 of "s" are positioned along an invisible baseline 252. The computer system returns the coordinate (x,y) between the characters 248 and 250 positioned along the baseline 252. An invisible bounding box having a height H and a width W surrounds the caret 178. The bounding box 254 can be sized to just exactly fit the caret 178, or it can be made slightly larger than the caret 178. In addition, a small "buffer zone" (not shown), can be provided around the caret 178 to provide a slightly larger contact area for a stylus, as will be discussed subsequently. Preferably, the caret 178 has an apex 256 with a pair of downwardly extending legs 258a and 258b. The apex 256 is preferably horizontally aligned with the X coordinate of the point (x,y), and is preferably about one pixel below the Y coordinate of the point (x,y).

Since the insertion marker for a caret 178 is used as a "button" to pop up the insertion menu 182, it is preferable that it is suitably configured to allow easy contact by the tip of a stylus the pen-based computer system. Many prior art insertion markers are simple, vertical lines (often blinking), which are difficult to contact with the tip of a stylus. Therefore, it is preferable that the bounding box 254 be configured with both substantial vertical and substantial horizontal dimensions to facilitate its selection from both vertical and horizontal directions. In one preferred embodiment, the bounding box 254 is approximately square. In other embodiments, the ratio between the height H and the width W can be in the range of 3:1 to 1:3. In other words, the height H can be as much as 3 times the width W, or the width W can be as much as three times the height H. However, as noted previously, it is preferable to choose a bounding box and an insertion marker which will provide a height H and width W that are more nearly equal.

Figure 8:
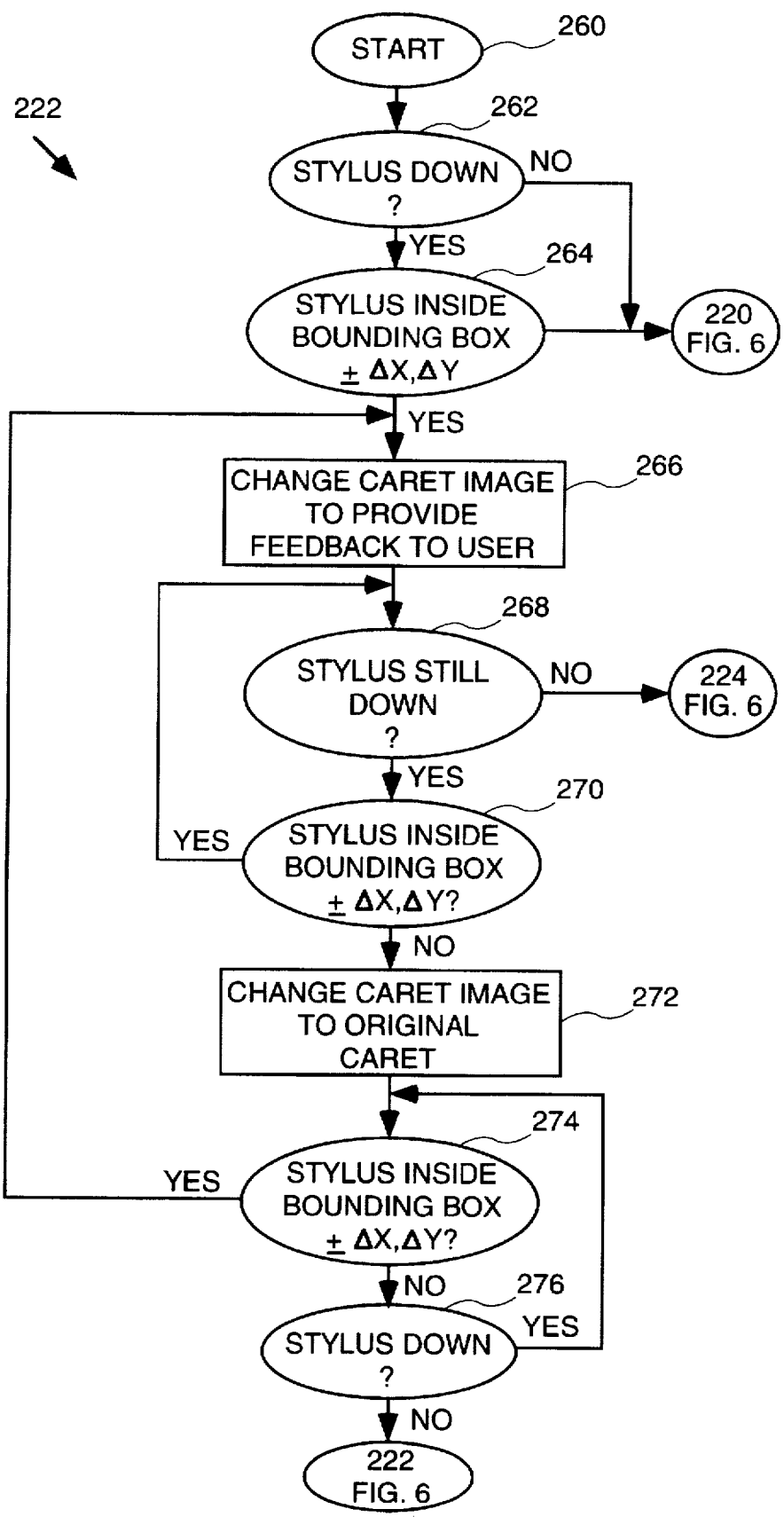
FIG. 8 is a flow-diagram of the "TAP ON CARET" step of FIG. 6.

In FIG. 8, the step 222 of FIG. 6 will be discussed in greater detail. More particularly, the process 222 begins at 260 and, in a step 262, is determined whether the stylus is down. If not, process control returns to step 220 of FIG. 6. If the stylus is down, a step 264 determines whether the stylus is inside of the bounding box 254 plus or minus a ΔX, ΔY. This ΔX, ΔY is the "buffer zone" referred to previously which allows the engagement of the stylus tip slightly outside of the bounding box. This helps with parallax problems due to the fact that the tablet of the computer system is separated from the screen of the computer system by a fraction of an inch.

If step 264 determines that the stylus is not inside the bounding box (at least within the tolerance of the buffer zone), process control is returned to step 220 of FIG. 6. Otherwise, the step 266 changes the caret image to provide feedback to the user. In other words, the caret is changed from the solid black caret to the outline caret as indicated in FIG. 5a. Next, step 268 determines whether the stylus is still down. If not, process control is returned to step 224 of FIG. 6, i.e., it is determined that the user has made an insertion selection of the insertion marker (caret). In other words, in the present embodiment an insertion selection is only made if the stylus was still within the bounding box (or at least within the buffer zone of the bounding box) at the time that the stylus is lifted from the tablet.

If step 268 determines that the stylus is still down, a step 270 determines whether the stylus is still within the bounding box plus or minus the ΔX, ΔY of the buffer zone. If so, process control is returned to step 268. If the stylus is moved outside of the bounding box and buffer zone, the caret image is returned to the original caret image, i.e., the normal black image of the caret.

Next, a step 274 determines whether the stylus has moved back within the bounding box plus or minus the ΔX, ΔY of the buffer zone. If so, process control is returned to step 266. If not, a step 276 determines whether the stylus is still down. If it is, process control is returned to step 274 to determine whether the stylus moves back into the bounding box or buffer zone. If step 276 determines that the stylus has been removed from the tablet (i.e., the stylus is "up"), then the process control is returned to step 220 of FIG. 6.

Figures 9, 9A:
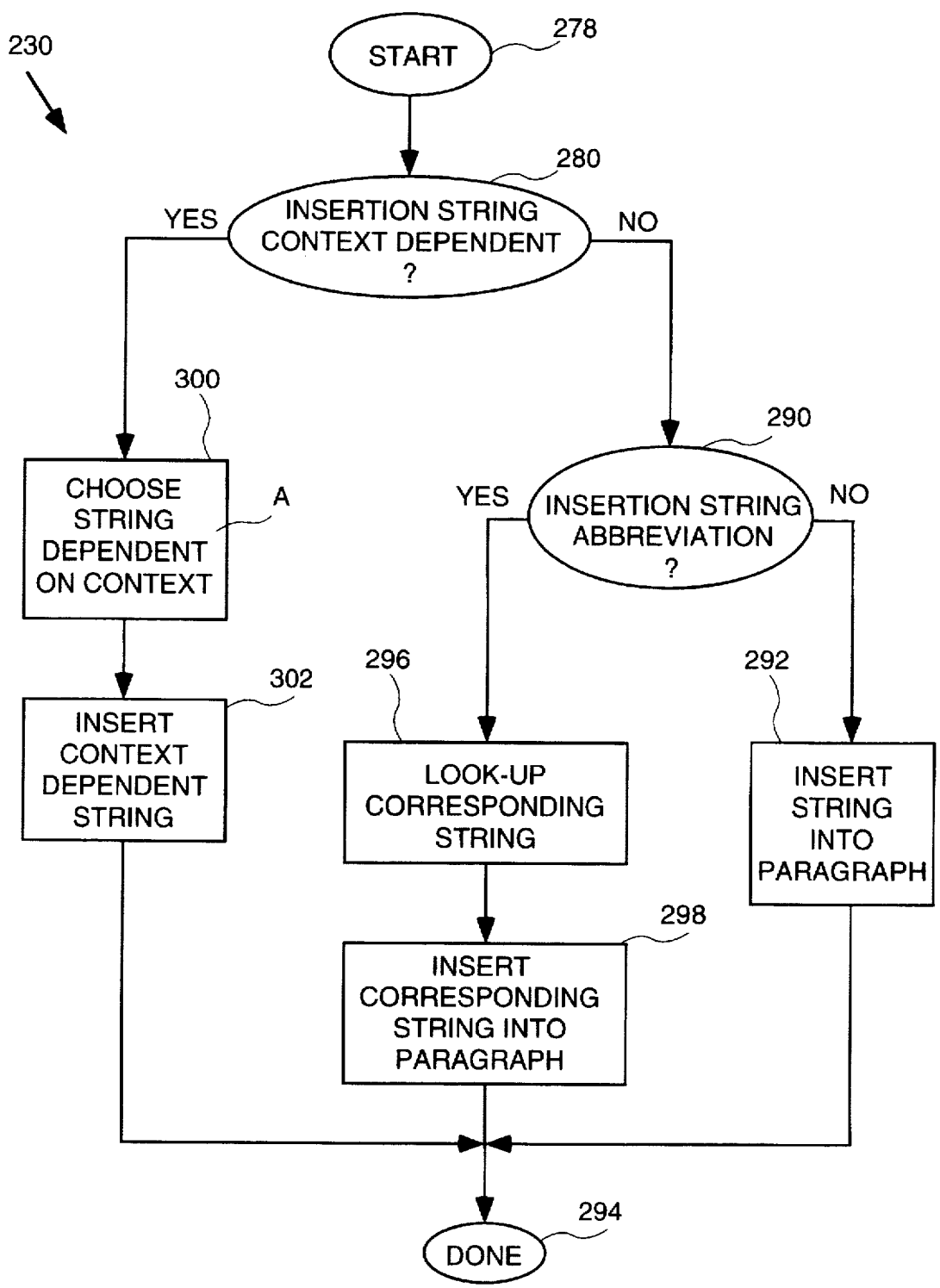
FIG. 9 is a flow-diagram of the "INSERT ITEM AT CARET POSITION" step of FIG. 6.
FIG. 9a is an illustration of a string of text information.

In FIG. 9, step 230 begins at 278 and, in a step 280, a decision is made whether the insertion item is context-dependent. Context-dependency will be discussed in greater detail subsequently. If not, a step 290 determines whether the insertion string is a long string corresponding to an abbreviation label. If not, the step 292 inserts the string into the paragraph or string of text information. As used herein, "paragraph" and string of text information are used somewhat synonymously since the strings of text information in the Newton® 120 are based upon the paragraph. It should be noted that the paragraph can include more than just recognized alphanumerics, punctuation, formatting characters, etc.; for example, the paragraph can also include unrecognized "ink." The process is then completed as indicated at 294.

If a step 290 determines that the insertion string is corresponds to an abbreviation label, a step 296 looks up the corresponding string from a table, and asserts the corresponding string into the paragraph (i.e., into the string of text information). The process then, once again, completed as indicated at 294. If the insertion string is determined to be context-dependent by step 280, a string is chosen dependent on the current context in a step 300. The context-dependent string is then inserted into the string of text information as step 302, and the process is completed at 294.

In FIG. 9a, an example of a string of text information 304 is shown. More particularly, the alphanumeric characters and punctuation that show on the screen 60 of the pen-based computer system are interspersed with invisible formatting characters such as "<SPACE>", "<CR>", etc. The paragraph-handling software will use this information and other formatting information to properly display the text image on the screen, as is well known to those skilled in the art. It is within this string of text information 304 that the present invention inserts alphanumeric characters, punctuation, long strings corresponding to abbreviation labels, etc.

Figure 9B:
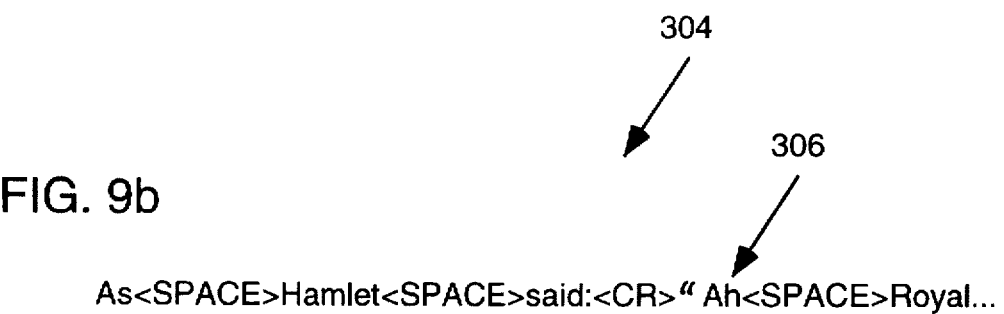
FIG. 9b is an illustration of the string of text information after a "curly quote" has been inserted.

In FIG. 9b, the string of text information 304 is shown with the insertion of context-dependent characters 306. In this example, the context-dependent characters are double quotes, sometimes known as "curly quotes." Curly quotes are of one type when they precede the quoted item, and are of another type when they come after the quoted item. Therefore, there are both left curly quotes (for example ")

and right curly quotes (for example "). The present invention permits the insertion of such context-dependent strings, as will be discussed in greater detail with reference to FIG. 10.

Figure 9C:
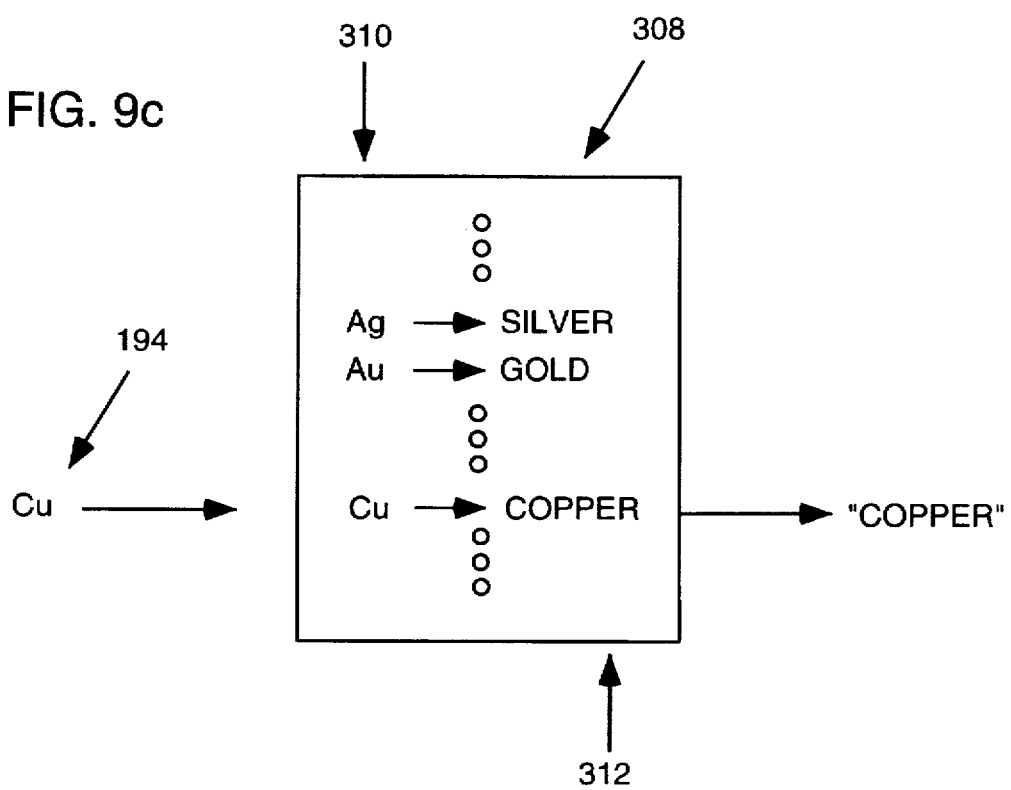
FIG. 9c is used to illustrate the insertion of a longer string using an abbreviation label.

In FIG. 9c, the operation of the step 296 of FIG. 9 can be discussed in greater detail. More particularly, a look-up table 308 is provided including a number of abbreviation labels 310 and the longer strings 312 which correspond to the abbreviation labels 310. In this example, the abbreviation Ag corresponds to the longer string "silver", the abbreviation Au corresponds to the longer string "gold", and the abbreviation Cu corresponds to the longer string "copper." Therefore, if the label 194 for the abbreviation Cu is selected from the insertion menu 182, step 296 will go to the look-up table 308 and determine that the appropriate corresponding string to insert into the string of text information or paragraph is "copper." Step 298 of FIG. 9 will implement this insertion.

Figure 10:
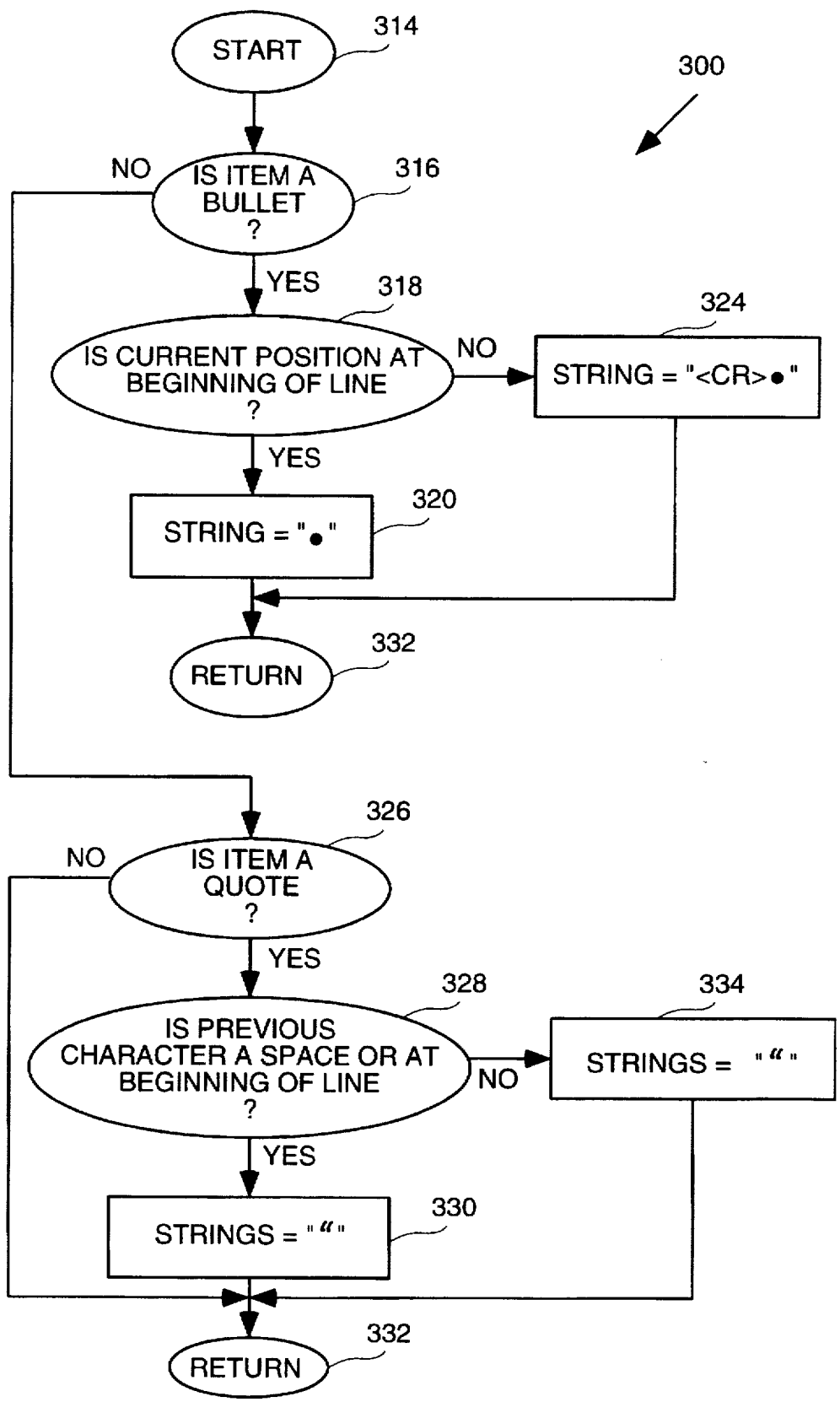
FIG. 10 is a flow-diagram of the "CHOOSE STRING DEPENDENT ON CONTEXT" step of FIG. 9.

In FIG. 10, the step 300 of FIG. 9 is discussed in greater detail. More particularly, process 300 begins at 314 and, in a step 316, it is determined whether the item or label selected from the insertion menu 182 is a "bullet" ("•"). As used herein, "item" is being used synonymously at times with "label" on the insertion menu 182, and with the insertion string corresponding to the label. In many cases, the label and the string are one and the same, e.g. the label for a left parenthesis "(" is the same as the string for the left parenthesis "(".

Next, in a step 318, if the item is a bullet it is determined whether the current position of the insertion marker is at the beginning of a line. If yes, the string to be inserted is "•" as indicated in step 320, and the process is completed as indicated at 322. If the current position of the insertion marker is not at the beginning of a line, the string is the longer "<CR>•". In other words, if the position of the insertion marker is not at the beginning of the line, a carriage return is first inserted into the string of text information before the bullet is inserted.

If the processor step 316 determines that the item was not a bullet, it is then determined in a step 326 whether the item is a quote. If it is, a step 328 determines whether a previous character is a space or is at the beginning of the line. If the answer is "YES", a step 330 determines that the string should be the left curly quote. If step 328 determines that the previous character to the insertion marker is not a space or is not the beginning of a line, then the string to be inserted as indicated at step 334 is the right curly quote. The process is then completed at 332.

If step 326 determines that the item is not a quote, additional context-dependent inquiries can be made in a fashion analogous to the inquiries made for the bullet and quote items. These additional items can then be handled prior to the completion at 332 of the process 300.

As will be appreciated from the above discussions, a pen-based computer system 106 with string inserter in accordance with the present invention includes a central processing unit (CPU) 12, digital memory coupled to the CPU (e.g. memory 14 or other digital memory directly or indirectly accessible by the CPU), a dual function display 16 coupled to the CPU 12 for displaying text on a screen and for receiving text inputs from the movement of a pointer over the screen, a mechanism for displaying an insertion marker on the screen, a mechanism for detecting an insertion selection of the insertion marker, a mechanism for displaying an insertion menu on the screen, a mechanism for detecting a selection of an insertion label of the insertion, and a mechanism for inserting an insertion string corresponding to the insertion label into the string of text information. The functionality of the pen-based computer system is preferably implemented with a combination of hardware and software, where the software resides in the digital memory and instructs the hardware to provide the desired functionality.

As will also be appreciated from the forgoing discussions, a method for inserting an insertion string into a string of text information for a computer system having a graphical user interface and a pointer capable of interacting with the graphical user interface includes the steps of: a) displaying an insertion marker on a screen of the computer system; b) detecting a selection of the insertion marker and providing an insertion menu in response thereto; and c) and detecting a selection of an insertion label of the insertion menu and inserting an insertion string corresponding to the selection into a string of text information to be displayed on the screen. The method of the present invention is preferably accomplished with a combination of hardware and software on a pen-based computer system.

A string inserter article of manufacture of the present invention includes a machine-readable medium and program instructions ("code") stored by the machine-readable medium. The program instructions include code related to the display of an insertion marker on a screen of a computer system, code related to the detection of a selection of the insertion marker and providing an insertion menu on the screen in response thereto, code related to the detection of a selection of an insertion label from the insertion menu, and code relating to the insertion of an insertion string corresponding to the insertion label into a string of text information that is to be displayed on the screen of the computer system. A number of suitable machine-readable mediums include, but are not limited to, floppy disks, hard disks, optical disks, read-only memory (ROM), random access memory (RAM), PCMCIA storage cards, remote file servers, etc.

While this invention has been described in terms of several preferred embodiments, there are alterations, permutations, and equivalents which fall within the scope of this invention. It is therefore intended that the following appended claims be interpreted as including all such alterations, permutations, and equivalents as fall within the true spirit and scope of the present invention.

What is claimed is:

1. A string inserter for a computer system having a graphical user interface and a pointer capable of interacting with said graphical user interface comprising:

an insertion marker displayed on a screen of a computer system having a graphical user interface at an insertion point for a string of text information being displayed on said screen, said insertion marker designates said insertion point for the string of text information and is capable of activating an insertion menu;

an insertion initiator operative to detect an insertion selection of said insertion marker with a pointer of said computer system and, in response to said insertion selection of said insertion marker, to provide said insertion menu adjacent to said insertion marker on said screen, said insertion menu including a plurality of insertion labels; and an insertion implementer responsive to a selection of an insertion label with said pointer and operative to insert an insertion string corresponding to said selection into said string of text information at said insertion point designated by said insertion marker.

2. A string inserter as recited in claim 1 wherein said insertion marker is associated with a bounding box, and wherein said insertion initiater detects said insertion selection when said pointer is sufficiently proximate to said bounding box to cause a selection.

3. A string inserter as recited in claim 2 wherein said bounding box has a height and a width having relative ratios that facilitate the selection of said insertion marker from both vertical and horizontal directions, respectively.

4. A string inserter as recited in claim 3 wherein said relative ratios are within the range of 3:1 and 1:3.

5. A string inserter as recited in claim 4 wherein said bounding box is approximately square.

6. A string inserter as recited in claim 2 wherein said insertion marker is a caret having an apex and two extending legs, said caret having a height and a width, where the ratios of said height and width are in the range of 3:1 and 1:3.

7. A string inserter as recited in claim 2 wherein said insertion initiater is further operative to change an appearance of said insertion marker as said pointer engages said insertion marker but before said detection of said insertion selection.

8. A string inserter as recited in claim 1 wherein said insertion menu is displayed in a laterally displaced position relative to said insertion marker such that said insertion marker remains visible.

9. A string inserter as recited in claim 1 wherein said insertion menu includes insertion labels corresponding to punctuation characters.

10. A string inserter as recited in claim 9 wherein said insertion menu includes at least one insertion label corresponding to a formatting character.

11. A string inserter as recited in claim 10 wherein said insertion menu includes at least one insertion label corresponding to a context dependent string.

12. A string inserter as recited in claim 11 wherein said insertion implementer is further operative to automatically choose an insertion string based upon a context when said insertion label corresponds to a context dependent string.

13. A string inserter as recited in claim 12 wherein said insertion label corresponding to a context dependent string is at least one of a bullet and a curly quote.

14. A string inserter as recited in claim 1 wherein at least one of said insertion labels is an abbreviation corresponding to a longer insertion string.

15. A string inserter as recited in claim 14 wherein said insertion implementer is further operative to retrieve an insertion string corresponding upon a selection of an insertion label of an abbreviation.

16. A pen-based computer system with a string inserter comprising:

a central processing unit (CPU);

digital memory coupled to said CPU;

a dual function display coupled to said CPU for displaying text on a screen, and for receiving text inputs from the movement of a pointer means over said screen;

means for displaying an insertion marker on said screen, said insertion marker designates an insertion position for the text being display on said screen;

means for detecting an insertion selection of said insertion marker by said pointer means;

means for displaying an insertion menu on said screen adjacent to said insertion marker, said insertion menu including a plurality of insertion labels;

means for detecting a selection of an insertion label by said pointer means; and means for inserting an insertion string corresponding to said selected insertion label into the text being display on said screen at the insertion position designated by said insertion marker.

17. A pen-based computer system with a string inserter as recited in claim 16 wherein said means for displaying an insertion marker comprises program instructions for said CPU that are stored in said digital memory and which cause an image of an insertion marker to be displayed on said screen.

18. A pen-based computer system with a string inserter as recited in claim 17 wherein said dual function display includes a transparent tablet positioned over said screen, and wherein said pointer means is a stylus, and wherein said means for detecting an insertion selection comprises program instructions for said CPU that are stored in said digital memory that detects a tip of said stylus on said transparent tablet that is essentially aligned with said image of an insertion marker on said screen.

19. A pen-based computer system with string inserter as recited in claim 18 wherein said means for displaying an insertion menu comprises program instructions for said CPU that are stored in said digital memory and which cause an image of an insertion menu including images of insertion labels to be displayed on said screen.

20. A pen-based computer system with string inserter as recited in claim 19 wherein said means for detecting a selection of an image of an insertion label comprises program instructions for said CPU that are stored in said digital memory that detects said tip of said stylus on said transparent tablet that is essentially aligned with said image of said insertion label on said screen.

21. A pen-based computer system with string inserter as recited in claim 20 wherein said string of text information is stored in said digital memory, and wherein said means for inserting comprises program instructions for said CPU stored in said digital memory.

22. A pen-based computer system as recited in claim 16 wherein said pen-based computer system further comprises:

a handwriting recognizer that produces said string of text information by recognizing a handwritten input on said screen of said computer system; and means for displaying a keyboard menu including a plurality of keyboard labels on said screen.

23. A pen-based computer system as recited in claim 22 wherein said handwritten input contains a punctuation character, and said handwriting recognizer has difficulty in accurately recognizing the punctuation character, and wherein said insertion marker is displayed on said screen adjacent to the punctuation character, and following said insertion selection of said insertion marker, said insertion menu is displayed, said insertion menu being substantially smaller than said keyboard menu, and the number of said insertion labels is substantially less than the number of said keyboard labels.

24. A string inserter comprising:

a machine-readable medium; and program instructions stored in said machine-readable medium and operative to:

display an insertion marker on a screen of a computer system having a graphical user interface, said insertion marker designates an insertion point for a string of text information being displayed on the screen;

detect an insertion selection of said insertion marker by a pointer of said computer system and providing an insertion menu on said screen adjacent to said insertion marker, said insertion menu including a plurality of insertion labels; and detect a selection of an insertion label by said pointer and inserting an insertion string corresponding to said selected insertion label into said string of text information being display on said screen at the insertion position designated by said insertion marker.

25. A string inserter as recited claim 24 wherein said program instructions display an insertion marker comprising a caret having an apex a pair of extending legs, where said apex points to an insertion point for said insertion string.

26. A string inserter as recited in claim 25 wherein said program instructions detect the selection of said caret with a pointer mechanism.

27. A string inserter as recited in claim 26 wherein said program instructions remove said insertion menu after detecting a selection of an insertion label.

28. A method of inserting an insertion string into text information being displayed on a display screen of a computer system, said computer system including a handwriting recognizer, the text information includes at least one hard-to-recognize character for said handwriting recognizer, said method comprising:

displaying an insertion marker on the display screen of the computer system to designate a desired insertion position;

positioning said insertion marker at a selected location in the text information being displayed;

generating an insertion request based on a tapping operation on said insertion marker being displayed;

displaying an insertion menu on the display screen adjacent to said insertion marker in response to said insertion request, said insertion menu primarily including replacement characters for those characters which said handwriting recognizer has difficulty recognizing correctly;

detecting a selected replacement character from said insertion menu being displayed on said display screen; and inserting said selected replacement character at the selected location designated by said insertion marker.

29. A method as recited in claim 28 wherein said inserting comprises:

automatically selecting a version of said selected replacement character based on the text information adjacent to said insertion marker; and inserting the version of said selected replacement character at the selected location designated by said insertion marker.

30. A method as recited in claim 28 wherein said method further comprises:

removing said insertion menu after said selected replacement character is detected.

31. A method as recited in claim 28, wherein said hard-to-recognize character is a punctuation mark.

32. A method as recited in claim 28, wherein said displaying of said insertion menu on the display screen displays said insertion menu such that said insertion marker remains visible.

* * * * *